(12) United States Patent
Rieger et al.

(10) Patent No.: US 8,839,317 B1
(45) Date of Patent: Sep. 16, 2014

(54) METHODS AND APPARATUS FOR PROVIDING MULTI-SOURCE BANDWIDTH SHARING MANAGEMENT

(75) Inventors: Remi F. Rieger, Broomfield, CO (US); Tom Gonder, Tega Cay, SC (US); Paul D. Brooks, Weddington, NC (US)

(73) Assignee: Time Warner Cable Enterprises LLC, New York, NY (US)

( * ) Notice: Subject to any disclaimer, the term of this patent is extended or adjusted under 35 U.S.C. 154(b) by 56 days.

(21) Appl. No.: 13/480,292

(22) Filed: May 24, 2012

(51) Int. Cl.
*H04N 7/173* (2011.01)
*H04N 7/10* (2006.01)
*H04N 7/12* (2006.01)
*G06F 15/173* (2006.01)

(52) U.S. Cl.
USPC .......... 725/87; 725/32; 725/93; 709/224; 375/240.01

(58) Field of Classification Search
USPC .......... 709/224, 245; 375/240.01; 725/32, 87
See application file for complete search history.

(56) References Cited

U.S. PATENT DOCUMENTS

| | | | |
|---|---|---|---|
| 7,127,524 B1 * | 10/2006 | Renda et al. | 709/245 |
| 7,774,818 B2 | 8/2010 | Helms et al. | |
| 7,889,765 B2 | 2/2011 | Brooks et al. | |
| 2003/0056217 A1 | 3/2003 | Brooks | |
| 2007/0116048 A1 * | 5/2007 | Addington | 370/468 |
| 2008/0320540 A1 | 12/2008 | Brooks et al. | |
| 2010/0086020 A1 * | 4/2010 | Schlack | 375/240.01 |
| 2010/0100935 A1 * | 4/2010 | Sato et al. | 726/3 |
| 2010/0251288 A1 * | 9/2010 | Carlucci et al. | 725/32 |
| 2010/0306810 A1 | 12/2010 | Brooks et al. | |
| 2011/0126244 A1 | 5/2011 | Hasek | |
| 2011/0141924 A1 * | 6/2011 | Froehlich et al. | 370/252 |
| 2011/0185045 A1 | 7/2011 | Rieger | |
| 2011/0277008 A1 | 11/2011 | Smith | |
| 2012/0066729 A1 * | 3/2012 | Zou et al. | 725/93 |
| 2012/0069737 A1 * | 3/2012 | Vikberg et al. | 370/232 |
| 2012/0151042 A1 * | 6/2012 | Garg et al. | 709/224 |

OTHER PUBLICATIONS

An Open Architecture for Switched Digital Services in HFC Networks, Rovira et al., SCTE 2006 Conference on Emerging Technologies, 28 pages.

* cited by examiner

*Primary Examiner* — Nasser Goodarzi
*Assistant Examiner* — Tariq Gbond
(74) *Attorney, Agent, or Firm* — Straub & Pokotylo; Michael P. Straub; Stephen T. Straub

(57) ABSTRACT

Methods and apparatus for providing one or more services such as video on-demand, switched digital video, or Internet services using shared bandwidth. Exemplary embodiments include methods and apparatus for providing video on-demand and switched digital video to a set of customer premise equipment devices using a first dedicated portion of the bandwidth to provide video on-demand services, a second dedicated portion of the bandwidth to provide switched digital video services, and a third portion of the bandwidth to provide both switched digital video and video on-demand services wherein the size of the bandwidth made available to provide video on-demand within the third shared portion of bandwidth varies as a function of requests for video on-demand and switched digital video services and the priorities of the new requests versus the existing operating services. Bandwidth management occurring in accordance with bandwidth sharing policies, priorities and rules generated by a bandwidth sharing mechanism.

22 Claims, 17 Drawing Sheets

DWDM
TRANSPORT

| STREAM TYPES | OPERATING | NEW STREAM |
|---|---|---|
| SDV (NEW STREAM) | 0 | 5 |
| I-SDV (INACTIVE SDV) | 0 | 0 |
| A-SDV (ACTIVE SDV) | 7 | 0 |
| On-Demand | 7 | 5 |

FIGURE 10

| | PROGRAMMING PACKAGE TYPE | OPERATING | NEW STREAM |
|---|---|---|---|
| 1112 | BROADCAST TIER (SIMULCAST) | 8 | 7 |
| 1114 | CABLE TIER (SIMULCAST) | 7 | 6 |
| 1116 | DIGITAL TIER | 7 | 6 |
| 1118 | SPORTS & GAMES TIER | 7 | 6 |
| 1120 | DIGITAL MOVIE TIER | 8 | 7 |
| 1122 | PREMIUM TIER | 8 | 7 |
| 1124 | SPANISH/ INTERNATIONAL TIER | 6 | 5 |
| 1126 | SPORT PACKAGES (E.G., NHL, NBA, NASCAR, NFL) | 9 | 7 |
| 1128 | HDTV TIER | 7 | 6 |
| 1130 | PPV EVENT | 9 | 8 |

FIGURE 11

| ON-DEMAND | OPERATING | NEW STREAM |
|---|---|---|
| FOD: FREE ON-DEMAND | 5 | 4 |
| SOD: SUBSCRIPTION ON-DEMAND | 7 | 6 |
| MOD: MOVIES ON-DEMAND | 10 | 8 |
| POD: PREMIUM ON-DEMAND | 8 | 7 |
| SO: START OVER ON-DEMAND | 6 | 5 |

FIGURE 12

| FORMAT TYPE | OPERATING | NEW STREAM |
|---|---|---|
| SD: STANDARD DEFINITION | 5 | 4 |
| HD: HIGH DEFINITION | 6 | 5 |

FIGURE 13

| TUNER PRIORITIES | OPERATING | NEW STREAM |
|---|---|---|
| LIVE TUNER – MAIN SCREEN | 5 | 4 |
| LIVE TUNER – PIP SCREEN | 3 | 2 |
| RECORDING TUNER | 4 | 3 |

FIGURE 14

| VIEWERSHIP PRIORITY | OPERATING | NEW STREAM |
|---|---|---|
| ACTIVE SUBSCRIBERS | TUNER COUNT | 0 |

FIGURE 15

METHODS AND APPARATUS FOR PROVIDING MULTI-SOURCE BANDWIDTH SHARING MANAGEMENT

FIELD OF INVENTION

The present invention relates to content delivery related methods and apparatus, and more particularly to methods and apparatus for providing one or more services such as video on-demand, switched digital video, or Internet services using shared bandwidth.

BACKGROUND OF THE INVENTION

Today, there are a variety of content distribution networks such as cable and satellite networks that are competing to bring various types of services, e.g., digital television programming services, on-demand services including video on-demand (VOD), MPEG video services, switched digital video (SDV) services, high definition television services, gaming services, and internet protocol services, to its customers/subscribers.

One of the ways that network operators try to distinguish themselves from competitors is by trying to offer new, different and varied services that will appeal to various segments of the public. For example by supplying dedicated entertainment services, e.g., programs that appeal to a majority of their customers as well as programs that appeal to specific portions of the population they can increase their customer base and the revenues they generate. By way of example, sports fans may desire a sports channel on which they can view programs dedicated to sporting events such as boxing events, football games, basketball games, soccer games, baseball games, volleyball tournaments, marathons, golf tournaments, tennis matches, car races, cycling races, etc. Movie buffs may wish to receive a video service that provides classic movies. Parents with young children may wish to receive video services providing cartoons. Others may wish any number of varied or different types of services such as new movie releases, dedicated news channels, Spanish language channels, weather channels, etc.

In addition to the operators being able to distinguish themselves from their competition by adding additional services, the network operators can also charge subscribers for premium or specialized services. For example, an operator may offer to its subscribers for a specific price, a video on-demand service wherein a subscriber can chose a movie from a listing of available titles and have the movie immediately transmitted to the subscriber's location. In addition, the subscriber may choose to pay an additional amount to receive the movie in a high definition television format.

Customers' demands and expectations for additional services have also been increasing. As the number of customers and the services they are provided increases so too does the requirement for additional network capacity also referred to as bandwidth to support the additional customers and services. For example, as more individuals buy high definition televisions, the number of subscribers requesting and/or expecting entertainment programs be provided in high definition television format is also increasing. Programs transmitted in high definition television format require about four times the bandwidth of the same programs transmitted in standard definition television format. Nevertheless, to meet its subscribers' requests and expectations network operators have increased the number and variety of programs that they provide in high definition television format. In many instances the network operator will provide a program in both standard definition television format and high definition television format. The ability to bring ever larger amounts of services (e.g., content and information) to an increasing number of customers/subscribers cheaply and efficiently is an on-going objective of network operators and directly affects a network operator's ability to sustain its customer/subscriber base and overall profitability.

In content distribution networks, e.g., the aforementioned cable and satellite networks, content, e.g., programs such as television shows or movies are typically transmitted to customers as encoded, multiplexed and modulated signal streams, e.g., MPEG-2 streams. Content distribution networks can be implemented using a wide variety of different architectures, configurations and components. One approach to implementing a content distribution network is to use a broadcast switching architecture with limited bandwidth.

From the above discussion it should be appreciated that in content distribution networks there is a need for allocating and utilizing bandwidth as efficiently as possible to maximize the usage of bandwidth in terms of revenue generating services and to providing subscribers the highest level of satisfaction possible with the limited amount of bandwidth available. While known attempts to address these needs have obtained some level of success there remains a need for new and improved methods and apparatus for efficiently sharing bandwidth between a variety of services in a content distribution system.

SUMMARY OF THE INVENTION

The present invention addresses, among other things, the need for efficient use of bandwidth in content delivery systems. The invention provides new methods and apparatus for providing one or more services such as video on-demand, switched digital video, or Internet services to customers using shared bandwidth.

One exemplary method in providing video on-demand and switched digital video using bandwidth to a first set of customer premise equipment devices in accordance with the present invention comprises using a first dedicated portion of the bandwidth to provide video on-demand services, a second dedicated portion of the bandwidth to provide switched digital video services, and a third portion of the bandwidth to provide both switched digital video and video on-demand services wherein the size of the bandwidth made available to provide video on-demand within the third shared portion of bandwidth varies as a function of requests for video on-demand and switched digital video services and the priorities of the new requests versus the existing operating services. In some embodiments the video on-demand service priority of the method is a priority for a video on-demand service and said switched digital video service priority is a priority for a switched digital video service. This approach facilitates efficient bandwidth sharing between VOD and SDV services.

In some implementations the system allocates bandwidth based on the priorities of different services as determined from service priority classifications, rankings and/or features. A new service having a higher priority than an exiting service or services may replace the existing service or services that have a lower priority.

In one exemplary embodiment of the present invention, the VOD and SDV service groups are aligned so that both service groups contain the same group of CPE devices. In addition to having separately dedicated narrowcast bandwidth and QAM modulators for switched digital video services and video on-demand services, a portion of narrowcast bandwidth and associated QAM modulators that are allocated to the aligned service groups is sharable.

In some embodiments of the present invention a new messaging scheme is implemented that simplifies the service discovery process and facilitates the alignment of multiple and varied service groups, the aligned service groups corresponding IDs, and the CPE devices assigned to the aligned service groups thereby facilitating the sharing of bandwidth allocated to the aligned service groups. In an exemplary embodiment, which will be discussed in further detail below, a new messaging scheme is provided for identifying video on-demand service groups. In the exemplary embodiment switched digital video and video on-demand service groups are aligned by being assigned the same CPE devices and service group IDs. With the alignment of the switched digital video and video on-demand service groups the ability to share bandwidth to provide services for switched digital video and video on-demand services to the CPE devices of the aligned services groups is facilitated.

Furthermore, in at least one embodiment, the number of edge resource managers is reduced as compared to known systems so that one resource manager manages requests for and allocation of resources necessary to fulfill requests for two or more services. For example, in some embodiments of the present invention a single edge resource manager is used to manage incoming requests for both switched digital video and video on-demand services and the allocation of resources, e.g., bandwidth and edge QAM modulators, necessary to provide the requested switched digital video and video on-demand services.

In some embodiments of the present invention, a bandwidth sharing mechanism generates rules, policies and/or priorities that can be, and are, distributed throughout the components of the network to facilitate the management and enforcement of efficient narrowcast bandwidth sharing for a variety of services.

For example, in at least one particular embodiment a bandwidth sharing mechanism module centrally located in the headend generates rules, policies and/or priorities that can be, and are, distributed to edge resource components located in one or more hub sites, e.g., edge resource managers, to facilitate the management and enforcement of efficient narrowcast bandwidth sharing for two or more services. One of the benefits of the distribution of rules, policies, and/or priorities to edge resources is the distribution of processing of requests to the edge resources eliminating processing and congestion in the headend as well as the delay introduced in communicating service requests to the headend for management of local resources to respond to requests. This distribution of rules, policies, and/or priorities by which local resource managers can manage the provisioning of local resources, e.g., modulators and bandwidth, in response to service requests makes the overall system more efficient and quicker in responding to service requests.

In another embodiment, a bandwidth sharing mechanism module is centrally located, e.g., in a headend, and generates rules, policies and/or priorities that are distributed to resource managers that control edge QAM resources located in the hub sites. The resource managers, may be and typically are, centrally located in this embodiment but may also be located in the hub sites. In some instances the resource managers are concentrated physically in the same location, e.g., headend equipment, but are logically distributed. The distribution of the rules, policies and/or priorities to the resource managers provides increased fault tolerance and facilitates local policy customization. One of the benefits of this distribution of rules, policies, and/or priorities to these resource managers is the distribution of processing of requests which can, and in some embodiments does, improve the overall performance of the system versus relying on the bandwidth sharing mechanism module to conduct the enforcement and arbitration of the rules, policies and/or priorities. In some embodiments similar efficiencies can be, and are, obtained by using multiprocessing or multithreaded processes in a centrally located server without distribution of the rules, policies and/or priorities.

In at least one embodiment, bandwidth is managed so that it is fully utilized or nearly fully utilized at all times. SDV streams corresponding to SDV services without registered users are used to occupy bandwidth not used for other services in at least some implementations. This reduces the amount of time required to provide the SDV when a user registers for the service.

Various additional features and advantages of the present invention are discussed in the detailed description which follows.

BRIEF DESCRIPTION OF THE DRAWINGS

FIG. 10 illustrates sample exemplary priority level designations for stream types in accordance with one embodiment of the present invention.

FIG. 11 illustrates sample exemplary priority level designations for programming package types in accordance with one embodiment of the present invention.

FIG. 12 illustrates sample exemplary priority level designations for on-demand types in accordance with one embodiment of the present invention.

FIG. 13 illustrates sample exemplary priority level designations for format types in accordance with one embodiment of the present invention.

FIG. 14 illustrates sample exemplary priority level designations for tuner type in accordance with one embodiment of the present invention.

FIG. 15 illustrates sample exemplary priority level designations for viewership in accordance with one embodiment of the present invention.

DETAILED DESCRIPTION

Figure 1:
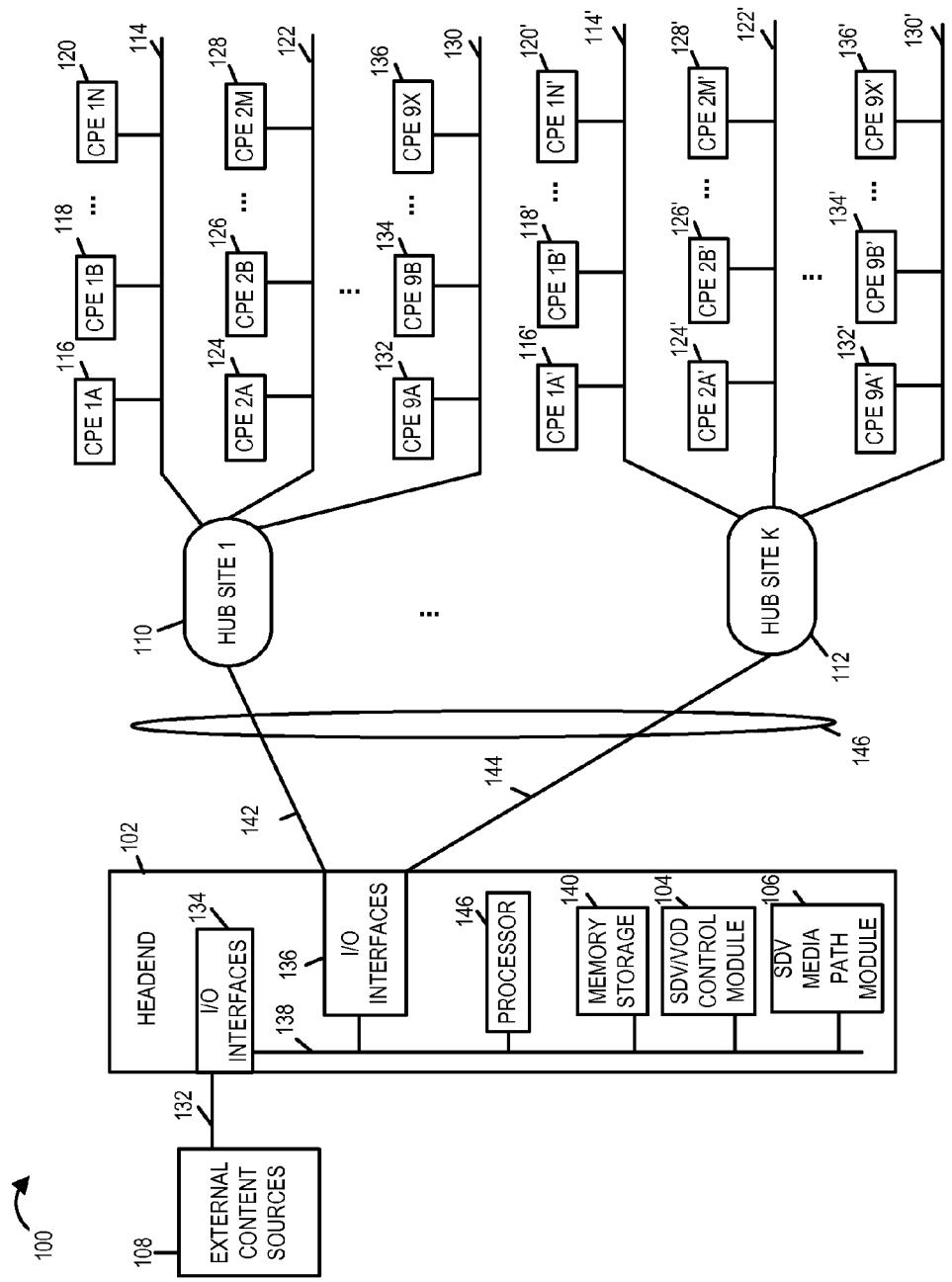
FIG. 1 illustrates an exemplary content distribution network 100 implemented in accordance with the present invention.

The current invention is applicable to various content distribution network architectures. One exemplary architecture used to implement an exemplary embodiment in accordance with the present invention is a broadcast switched architecture. Such a network typically includes a headend, hub sites, customer premise equipment (CPE) devices and a communication network with limited bandwidth, e.g., a cable network.

The headend is controlled by an operator, e.g., a Multiple Systems Operator (MSO), that determines what content is to be distributed to its customers/subscribers. Headends are generally centrally located systems while hub sites are network nodes that are typically located in close proximity to the CPE devices to which they are connected and support. The switching gear, servers, Quadrature Amplitude Modulation (QAM) modulators and other equipment contained within a hub site are sometimes referred to as edge devices because they are located at the edge of the content distribution network.

In various embodiments of the present invention, video on-demand content is supplied to CPE devices via one or more video on-demand servers where the content is typically but not always stored. In some situations, the video on-demand content servers are not owned by the MSOs and, while connected to the content distribution network, are not located in the headends or hub sites but the distribution of the video on-demand content is still controlled by the headends and/or hub sites. In some situations, the video on-demand content servers may be, and are, located in one or more headends and/or hub sites.

Switched digital video services provide linear programming such as for example scheduled video programming broadcasts, e.g., a news program scheduled to start at 10:00 p.m. and end at 10:59 p.m. In various embodiments of the present invention, switched digital video content is not stored on a server in the hub site but is instead a real time program stream that is provided from the headend to the hub site and switched onto a transmission medium, e.g., cable, to be distributed to a switched digital video service group containing a plurality of CPE devices. Switched digital video servers can be and often are owned by the MSOs and are usually located in the hub sites and/or headends. In some embodiments, the switched digital video server is a collection of software processes that control the binding and unbinding of streams to sessions, and manage the associated bandwidth. Unlike video on-demand servers, switched digital video servers generally do not directly handle media streams but instead the media stream is provided directly from an internet protocol switch/router into the edge QAM at the hub site with the switched digital video server managing the setup and connection. The switched digital video servers and associated modules are primarily responsible for acting as a termination point for requests from CPE devices and for performing equipment bandwidth management functions such as for example instructing the QAM modulators where a new video flow should be carried within the multiple available QAM channels feeding a service group, keeping track of all flows in those QAM channels, and directing tear-down of flows that are no longer desired. The switched digital video server also creates, updates and distributes the Mini-Carousel stream to CPE devices via the switch-routers and QAM modulators. The Mini-Carousel stream is a MPEG-2 compliant stream that contains client configuration, CPE device assignments, and a list of services currently streaming to each service group along with the tuning information to access each service. Each service group has its own mini-carousel. A duplicate copy of this mini-carousel is carried on each QAM channel operating in the service group to provide instant CPE access with no further tuning required. The switched digital video server also receives service requests for switched digital video content from CPE devices and responds to the CPE devices with the frequency and program number where the content may be found and the modulation depth used by the QAM channel.

In some embodiments, other content servers such as for example video game servers may be, and are, located in or associated with the content distribution network in a similar manner to the video on-demand and/or switched digital video servers described above.

In one particular exemplary embodiment there are roughly 40 switched digital video servers providing switched digital video to populations ranging from 20 thousand to 25 thousand customer premise equipment devices, e.g., set top boxes per server. The aforementioned numbers are intended to be exemplary and not limiting. Each transmission medium, e.g., cable, in a system is connected to a group of homes, which contain one or more CPE devices. The groups of CPE devices are referred to as service groups. The headend and hub site equipment assign each CPE device to a particular group, e.g., switched digital video service group, indicating the switched digital video server address to which the CPE device should send requests. A set of modulators, e.g., Quadrature Amplitude Modulation (QAM) modulators, usually located in the hub site are assigned to the service group so that messages e.g., content and control signals, can be modulated and sent to the CPE devices.

There are separate service groups for different services, for example, there is a video on-demand service group and a separate switched digital video service group. One switched digital video server may support multiple switched digital video service groups. Each service group is assigned a service group ID by equipment in either the headend and/or the hub site. One CPE device may, and usually does, belong to a number of different service groups, e.g., a video on-demand service group and a switched digital video service group. When a CPE device requests a service it must identify the service group to which it belongs typically by identifying its service group ID. In known current systems the switched digital video service group discovery process is different than the video on-demand service group discovery process. The use of separate processes and unrelated switched digital video and video on-demand service group IDs adds additional complexity and equipment to current content distribution systems. One aspect of the present invention is to align one or more service groups, e.g., the switched digital video and video on-demand service groups, so they can use the same and/or similar service group discovery processes, use less equipment to manage the service groups, and obtain the ability to share bandwidth and equipment to support the aligned service groups.

Services within the content distribution network are sometimes characterized as multicast or unicast. Multicast services, e.g., programs in the context of some video distribution systems, include services that can be viewed or consumed by two or more end-points at the same time while unicast programs are those that can only be viewed or consumed by a single end-point and/or user. Broadcast transmissions are sometimes referred to as multicast. An example of a multicast program transmission in this sense of the term is a TV program that is transmitted to multiple end-points/users that starts at a pre-defined time on a pre-defined channel and progresses linearly. Narrowcast services are sometimes implemented as unicast services. An example of a unicast service is a program transmission such as a video on-demand program wherein a user selects a movie to view and has the ability to control the video's playback such as start, rewind, forward, and pause. In the video on-demand unicast example, the video on-demand content is only viewed by a single endpoint/user. While multicast video services often include services which allow a group of viewers to view content at the same or approximately the same time, such services are not limited or constrained to use multicast IP. In the case of multicast IP, an individual IP packet is delivered to multiple multicast group members who use the same multicast IP address. In contrast to multicast IP addresses, each unicast IP address corresponds to only a single destination device. In the case of SDV service to legacy MPEG CPE, the CPE is not provided with and does not require the IP address associated with a given video flow.

Various embodiments of the content distribution networks described herein encounter capacity or bandwidth constraints that limit the number and type of services that may be provided to customers/subscribers. For example, in various embodiments the transmission mediums that are used to connect the content distribution equipment (e.g., video on-demand and switched digital video servers) with the CPE devices have finite or limited capacity to bear or carry information such as control signals and data content. The capacity of a transmission medium to carry information is also referred to as bandwidth. As a result of the bandwidth limitations, there is a limited amount of information that can be made available to the CPE devices at any one time. In some instances there are more requests for services than bandwidth available to support the requested services, which results in the blocking or denying of one or more services and/or service requests.

In content distribution networks and in particular in broadcast switched architecture networks, the way in which services are provided and bandwidth is typically utilized changes over time. For example, with video on-demand services the number of services being provided directly correlates to the number of service requests that are received. The amount of bandwidth utilized is not only a function of the number of requests but the type of service request such as whether high definition television format is requested or standard definition television is requested and whether the encoding rate is MPEG-2 or MPEG-4. With respect to switched digital video services the way in which the switched digital video services are provided and the bandwidth is utilized is a function of a variety factors. One factor common to switched digital video and video on-demand is the type of service being requested, e.g., high definition television format or standard definition television format. Another factor is whether the requested service is for picture in picture viewing which may, and in some implementations does, require less bandwidth than a main screen video picture viewing. In some instances, programs or services may be, and are, provided for use by a large number of users while for other services there is only a small viewership, and in other instances no CPE devices may be tuned into the services. In content distribution systems that have only separately dedicated switched digital video and video on-demand bandwidth the provisioning of services is less than optimal. For example, SDV services are provided when no users are viewing or even requesting the service while at the same time VOD requests are being denied because of a lack of bandwidth to provide the requested VOD service. Similarly, at other times VOD bandwidth is being held in reserve for potential future VOD requests which results in the blocking of requested SDV services when there is insufficient bandwidth. Moreover, there is neither service level prioritization nor a mechanism between SDV services and VOD services to determine how narrowcast bandwidth should be allocated when there is insufficient bandwidth.

Narrowcast bandwidth for VOD services and QAM modulators associated therewith are usually dedicated to supporting unicast transmissions to CPE devices in a particular VOD service group. Similarly a separate allocation of bandwidth and QAM modulators associated therewith are dedicated to providing switch digital video services to a particular SDV service group.

Figure 4:
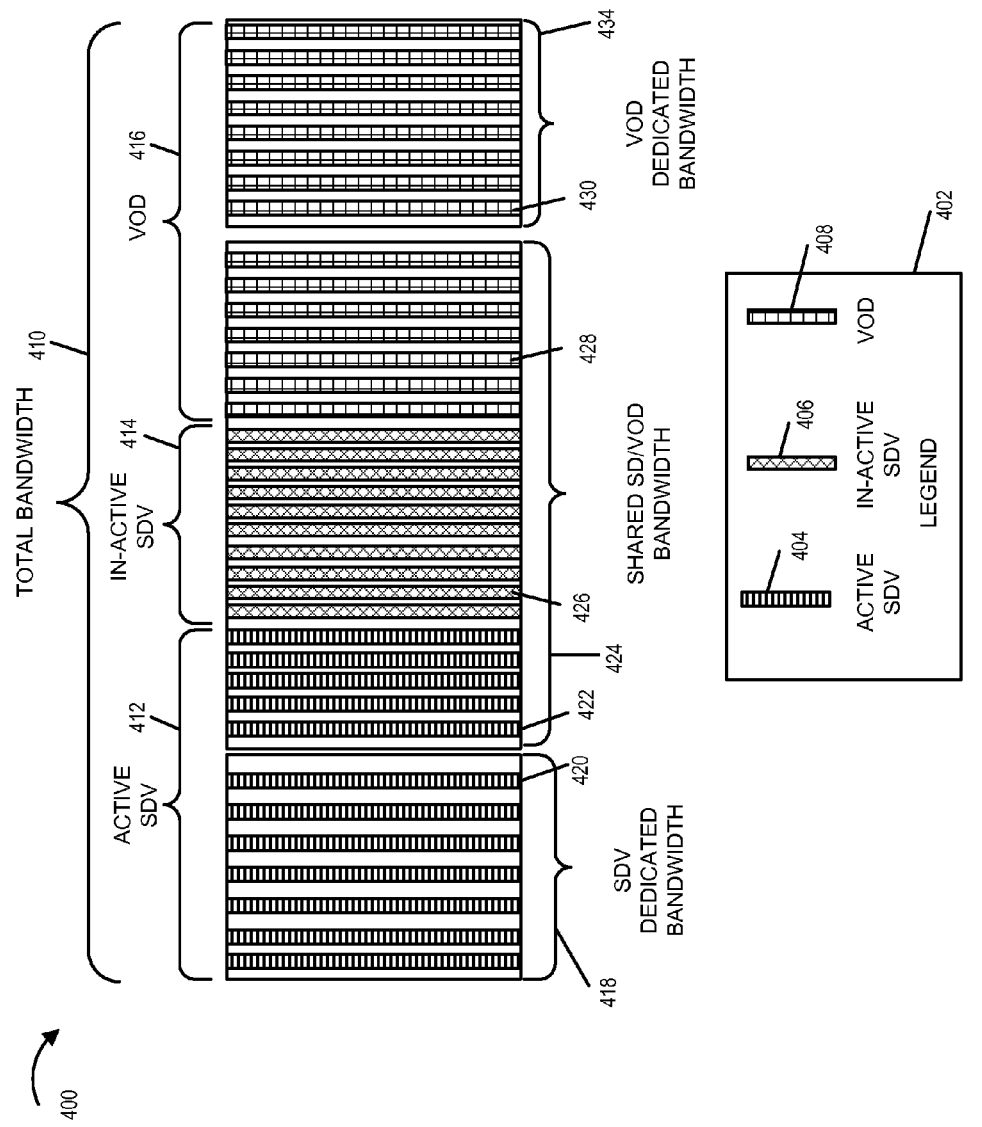
FIG. 4 illustrates an exemplary allocation of bandwidth in accordance with one embodiment of the present invention.

In one exemplary embodiment of the present invention, the VOD and SDV service groups are aligned so that both service groups contain the same group of CPE devices. In addition to having separately dedicated narrowcast bandwidth and QAM modulators for switched digital video services and video on-demand services, a portion of narrowcast bandwidth and associated QAM modulators that are allocated to the aligned service groups is sharable. That is the bandwidth and associated QAM modulators can be used to provide either switched digital video or video on-demand services. Exemplary bandwidth allocation diagram 400 of FIG. 4 illustrates how the total bandwidth may be, and in some embodiments of the present invention is, allocated into three portions. The first portion containing bandwidth dedicated for use in providing video on-demand services 434, the second portion dedicated for use in providing switched digital video services 418 and the third portion being sharable bandwidth 424 that can be, and is used, for providing switched digital video and video on-demand services. Bandwidth allocation will be discussed in further detail in connection with FIGS. 4 and 5. It should be noted that in some embodiments of the present invention the bandwidth may be, and is entirely sharable bandwidth. In some embodiments of the present invention there is only sharable bandwidth and dedicated switched digital video bandwidth. In some embodiments of the invention there is only sharable bandwidth and dedicated video on-demand bandwidth. While the exemplary embodiment discusses the allocation and sharing of bandwidth based on two exemplary services, video on-demand and switched digital video, the invention can be applied to the sharing of narrowcast bandwidth for any two or more services.

From the above discussion it should be appreciated that in content distribution networks there is a need for allocating and utilizing bandwidth as efficiently as possible to maximize the usage of bandwidth in terms of revenue generating services and to providing subscribers the highest level of satisfaction possible with the limited amount of bandwidth available. There is a further need to simplify the service group discovery processes and align the switched digital video and video on-demand service group IDs and discovery processes so as to simplify the mechanism by which the CPE devices can identify the SDV and VOD service groups to which they belong.

In some embodiments of the present invention a new messaging scheme is implemented that simplifies the service discovery process and facilitates the alignment of multiple and varied service groups, the aligned service groups corresponding IDs, and the CPE devices assigned to the aligned service groups thereby facilitating the sharing of bandwidth allocated to the aligned service groups. In an exemplary embodiment, which will be discussed in further detail below, a new messaging scheme is provided for identifying video on-demand service groups. In the exemplary embodiment switched digital video and video on-demand service groups are physically and logically aligned by being assigned the same CPE devices and service group IDs. With the alignment of the switched digital video and video on-demand service groups the ability to share bandwidth to provide services for switched digital video and video on-demand services to the CPE devices of the aligned services groups is facilitated.

Furthermore, in at least one embodiment, the number of edge resource managers is reduced as compared to known systems so that one resource manager manages requests for and allocation of resources necessary to fulfill requests for two or more services. For example, in some embodiments of the present invention a single edge resource manager is used to manage incoming requests for both switched digital video and video on-demand services and the allocation of resources, e.g., bandwidth and edge QAM modulators, necessary to provide the requested switched digital video and video on-demand services.

In some embodiments of the present invention, a bandwidth sharing mechanism generates rules, policies and/or priorities that can be, and are, distributed throughout the components of the network to facilitate the management and enforcement of efficient narrowcast bandwidth sharing for a variety of services.

For example, in one particular embodiment a bandwidth sharing mechanism module centrally located in the headend generates rules, policies and/or priorities that can be, and are, distributed to edge resource components located in one or more hub sites, e.g., edge resource managers, to facilitate the management and enforcement of efficient narrowcast bandwidth sharing for two or more services. One of the benefits of the distribution of rules, policies, and/or priorities to edge resources is the distribution of processing of requests to the edge resources eliminating processing and congestion in the headend as well as the delay introduced in communicating service requests to the headend for management of local resources to respond to requests. This distribution of rules, policies, and/or priorities by which local resource managers can manage the provisioning of local resources, e.g., modulators and bandwidth, in response to service requests makes the overall system more efficient and quicker in responding to service requests.

In some embodiments of the present invention, the bandwidth sharing mechanism module includes a software rules engine that creates the narrowcast bandwidth sharing policies. This software rules engine derives and/or is provided information and/or data about the various services in use in the network and in particular in the headend and hub site nodes for which it is responsible for creating bandwidth sharing policies. In some exemplary implementations, the bandwidth sharing mechanism module's software rule engine creates a table of states and assigns a priority and/or policy to each service available to a subscriber of the system based on the information and/or data collected regarding the service. In some variants of the embodiments of the present invention, the software rules engine parameterizing the information and/or data derived and/or provided regarding each service and creates a table of states and assigns a priority and/or policy to each service available to a subscriber of the system based on the parameterized information and/or data. In some variants of the embodiments of the present invention, the software rules engine initializes the table of states and priorities by assigning default values to each of the services based on overall system objectives and service types such as pay services having a higher priority over free services.

FIG. 1 illustrates an exemplary content distribution network 100 having a broadcast switching architecture implemented in accordance with the present invention. The exemplary system 100 includes external content sources 108, a network headend 102, e.g., a cable network headend which may be located at a single building site, a plurality of K network hub sites 110 thru 112, e.g., cable network hub sites, a plurality of customer premise equipment devices 116, 118, 120, 124, 126, 128, 132, 134, 136, 116', 118', 120', 124', 126', 128', 132', 134', and 136', e.g., set-top boxes, a communication link 132 coupling the external content sources 108 to headend 102, a set of communication links 146 including links 142 thru 144 coupling headend 102 to the plurality of K hub sites, and a plurality of communication links 114, 122, 130, 114', 122', 130', e.g., a hybrid fiber-optic coaxial (HFC) network of links, coupling the CPE devices to the K hub sites. Headends and hub sites are sometimes referred to as network nodes.

Exemplary headend 102 includes a plurality of devices/modules, e.g., input/output (I/O) interfaces 134 and 136, memory storage 140, switched digital video/video on-demand (SDV/VOD) control module 104, switched digital video (SDV) path module 106, a processor 146 and communication link 138. Communication link 138 may be, and in some embodiments of the present invention is, a local area network that couples various components within the headend 102 including the I/O Interfaces 134, 136, memory storage 140, SDV/VOD control module 104, SDV media path module 106 and processor 146. In addition to processor 146, other headend components, e.g., SDV/VOD control module 104 and/or SDV media path module 106, may, and in some embodiments do, include one or more processors.

Headend 102 receives content, e.g., video streams, multimedia data, audio streams, and programming from a variety of external content sources 108 via communication link 132 through I/O interfaces 134 which may, and in some embodiments, does include one or more receivers and/or transmitters. Exemplary link 132 may be, and in some embodiments is, one or more physical and/or logical bi-directional and/or uni-directional links for communicating content, control messages, signals and/or data between one or more components of headend 102 and external content sources 108. The type of physical transmission medium of the one or more links may, and in some embodiments does, vary. Exemplary links include wired and wireless links, e.g., fiber-optic cables, coaxial cables, satellite transmissions, microwaves and radio frequency waves.

Exemplary external content sources include satellite transmissions; terrestrial off-air; IP data networks; fiber-optic networks; video content storage servers, e.g., video on-demand servers, movie on-demand servers; audio content servers; storage media; content storage databases; game servers; emergency broadcast systems; and other network nodes. Headend 102 in some embodiments of the present invention in addition to receiving content from one or more external sources also contains one or more content sources such as for example the aforementioned video on-demand servers, audio content servers, and content contained on storage media and/or in memory storage 140.

Figure 3:
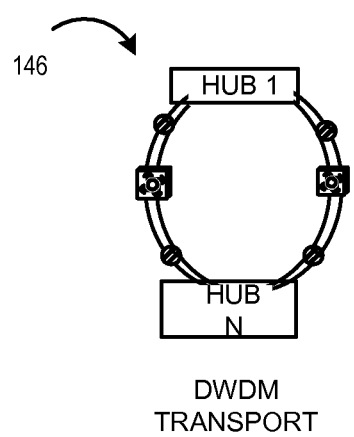
FIG. 3 illustrates an optical transport ring that is utilized to distribute dense wave-division multiplexed (DWDM) optical signals to hub sites in accordance with one embodiment of the present invention.

In the exemplary embodiment the headend 102 is coupled to hub site 1 via link 142 of the set of communication links 146. Information, data, signals and content is outputted from I/O Interfaces 136 which may, and in some embodiments does, include one or more transmitters and/or receivers to link 142. As discussed in connection with link 132, link 142 and the other links that couple headend 102 to each of the hub sites 1 thru K, e.g., link 144, may be, and in some embodiments are, one or more physical and/or logical bi-directional and/or uni-directional links for communicating content, control messages, signals and/or data between various components of headend 102 and components of the hub sites. The type of physical transmission medium of the one or more links may, and in some embodiments does, vary. Exemplary links include wired and wireless links, e.g., fiber-optic cables, coaxial cables, satellite transmissions, microwaves and radio frequency waves. Typically wired links are used to couple the headend to the hub sites it controls. Information such as content is usually transmitted between the headend and hub sites as IP (internet protocol) data containing MPEG-2 transport streams. FIG. 3 shows one exemplary embodiment of the set of links 146 that couples the headend 102 to each of the K hub sites. In FIG. 3, the set of links 146 is implemented as an optical transport ring that is utilized to distribute dense wave-division multiplexed (DWDM) IP optical signals to each hub in the ring.

Figure 9:
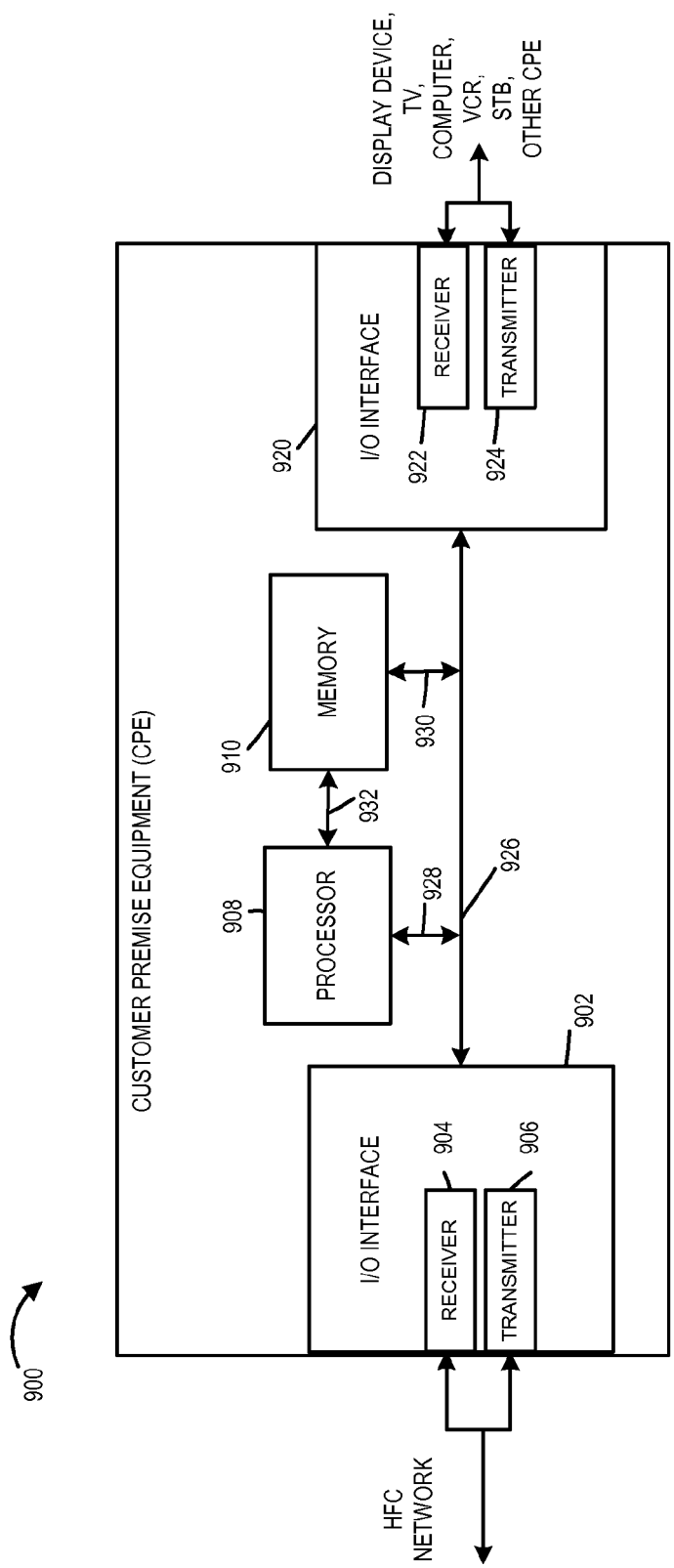
FIG. 9 illustrates some of the implementation details of an exemplary Customer Premise Equipment (CPE) device in accordance with one embodiment of the present invention.

In the exemplary embodiment of FIG. 1, each of the plurality of K hub sites, 110, 112, is coupled to a number of customers'/subscribers' CPE devices by a transmission medium such as for example a hybrid fiber optic coaxial (HFC) cable network. Customer Premise Equipment (CPE) refers to any type of electronic device located in a customer's premises or other suitable location and is coupled to the content distribution network. Exemplary CPE devices include set-top boxes, digital video recorders (DVRs), televisions, cable modems, embedded multimedia personal adapters (eMTAs), and personal computers. FIG. 9 discussed in detail below depicts some of the implementation details of an exemplary Customer Premise Equipment (CPE) device 900 in accordance with one embodiment of the present invention.

In the exemplary embodiment of FIG. 1 link 114, e.g., a HFC cable forming an RF trunk, connects a plurality N of CPE devices to hub site 1 110. In the exemplary embodiment of FIG. 1, link 114 couples CPE devices (1A) 116, (1B) 118 thru (1N) 120 to hub site 1 110. The plurality of CPE devices 116, 118 thru 120 coupled to hub site 1 110 via link 114 can, and in some embodiments does, form a first service group. Link 122 similarly connects a plurality M of CPE devices (2A) 124, (2B) 126 thru (2M) 128 to hub site 1 110 and CPE devices 124, 126 thru 128 can, and in some embodiments does, form a second service group. There can be a total of 9 services groups of CPE devices connected to the hub site 1 110. A plurality of X CPE devices including CPE devices (9A) 132, (9B) 134 thru (9X) 136 can, and in some embodiments does, form the ninth service group and are coupled to hub site 1 110 via link 130. Links 114, 122, and 130 are any two-way suitable transmission medium capable of supporting the services to be offered to the CPE devices in the service groups connected by the link. For example, the links may be, and in some embodiments of the present invention, are wired and/or wireless. Exemplary links include coaxial cable, fiber-optic cable, microwave, and satellite network links.

The hub site 1 110 contains a variety of components including devices/modules for managing and allocating bandwidth to provide requested services, (e.g., switched digital video and video on-demand services), servers, switches/routers, and modulators (e.g., Quadrature Amplitude Modulation (QAM) modulators)) which are used to selectively provide the requested services to one or more CPE devices in the plurality of service groups supported by hub site 1 110 based upon one or more service requests, the priority of those service requests, and the amount of bandwidth available on the link connecting the requesting CPE devices to the hub site 1 110.

Each of the remaining plurality of hub sites connected to headend 102, the associated CPE devices, and coupling links operate in a similar manner to hub site 1 110 and contain similar equipment and modules. The CPE devices and links coupled to hub site K 112 bear numerical labels the prime of the numerical labels used in the description of similar CPE devices and links in connection with hub site 1 110. The descriptions provided in connection with hub site 1 110 and the associated CPE devices and links coupled thereto are also applicable to the corresponding CPE devices and links bearing the prime numerical labels in relation to the operation of hub site K 112 and the associated CPE devices, links and service groups.

In some embodiments of the present invention, the SDV/VOD control module 104 is responsible for the assignment of CPE devices to particular video on-demand and switched digital video service groups and alignment of the video on-demand and switched digital video services to allow for the sharing of bandwidth to support switched digital video and video on-demand service requests. In some embodiments the SDV/VOD control module 104 is also responsible for managing, by for example, generating, applying, and distributing rules, policies and/or priorities for the allocation of bandwidth, e.g., shared and dedicated bandwidth, to be used to provide services such as for example switched digital video and on-demand services to CPE devices connected to the K hub sites connected to and controlled by headend 102. In some embodiments, the SDV/VOD Control module 104 includes a Session Resource Manager that is responsible for allocating sessions of bandwidth in response to service requests, e.g., switched digital video service requests. In some embodiments, the SDV/VOD control module 104 is responsible for arbitrating between various service requests when insufficient bandwidth is available to support the current services and newly requested services. In some embodiments the SDV/VOD Control module 104 generates priority tables to be used in the enforcement of narrowcast bandwidth sharing policies such as for example those shown in FIGS. 10, 11, 12, 13, 14, and 15. In some embodiments of the present invention, the SDV/VOD Control module 104 includes a Bandwidth Sharing Mechanism module previously described.

In the exemplary embodiment of the present invention, the SDV Media Path module 106 is responsible for conditioning (e.g., encrypting, encoding and modulating) and selectively distributing requested content, e.g., SDV content, by way of switches/routers from the headend to the plurality of hub sites.

Processor 146 of headend 102, may, and in some embodiments does, execute software program instructions stored in memory storage 140 to control hardware and/or software in the headend to manage the receipt, processing, and transmission of control and content data signals into and out of the headend 102. For example, in an embodiment processor 146 executes instructions that command the switches/routers contained in the SDV Media Path module 106 to selectively distribute, i.e. transmit, content to the plurality of hub sites 1 thru K, 110, 112 via I/O Interfaces 136 over the plurality of links, 142 thru 144, coupling the headend to the plurality of hub sites. The content selectively distributed to the hub sites is content either received from the external content sources 108 or was content contained/stored in the headend.

In some embodiments content received from the external content sources 108 via I/O Interfaces 134 is routed for storage in memory storage 140 by the switches/routers in the SDV Media Path module 106 using link 138. The stored content is then available for transmission to the hub sites at a later time. In some embodiments the SDV/VOD Control module 104 will send control messages to the SDV Media Path module via link 138 commanding it to retrieve the stored content, e.g., a movie, from memory storage 140 and using the SDV Media Path module's switches/routers to output the content to one or more hub sites 1 thru K via I/O Interfaces 136 in response to requests for service seeking the stored content, e.g., service requests from one or more customer premise equipment devices received by the SDV/VOD Control module 104.

FIG. 900 illustrates some of the details of an exemplary CPE device 900. CPE device 900 includes an I/O Interface 902 for interfacing with the content distribution network, e.g., link 114 of FIG. 1 which may be, and in some embodiments is, a part of a HFC network, a processor 908, a memory 910, an I/O Interface 920 for interfacing to one or more output devices, e.g, display devices, television sets (TVs), computers, video cassette recorders (VCR), digital video recorders (DVRs), set-top boxes (STBs), WIFI devices, routers, and other CPE devices. In some embodiments exemplary CPE device 900 may be, and is incorporated, into a TV, set-top box, DVR, etc. I/O interface 902 of CPE device 900 includes a receiver 904 for receiving communications such as for example control and data messages and/or signals, e.g., MPEG-2 messages, from equipment in the distribution network via the communication link coupling the hub site to the CPE device. The receiver can, and in some embodiments does, include one or more tuners. The I/O interface 902 also includes a transmitter 906 for transmitting messages and signals, e.g., requests for service to equipment in the distribution network via the communication link coupling the hub site to the CPE device. I/O Interface 920 of CPE device 900 includes a receiver 922 and a transmitter 924 for communicating with other devices, e.g., a display device such as a television. CPE 900 also includes internal communication links 926, 928, 930 and 932, e.g., wires and/or wire traces, for coupling various components within the CPE device thereby allowing for the communication of information, data, and control signals between the various components. Communication link 926 may be, and in some embodiments is, a bus to which I/O Interfaces 902 and 920, processor 908 and memory 910 are coupled. Links 928 and 932 couple the processor to link 926 and memory 910 respectively. Link 930 couples memory 910 to the link 926. Memory 910 is used to store data as well as program instructions for the processor 908. In some embodiments of the present invention, CPE memory 910 may, and does include various types of software instructions including for example operating system software, client application software, program guide software, encoding/decoding software, encrypting/decrypting software, client SDV software, client VOD software, etc. CPE 900 sometimes also contains various specialized software modules and/or hardware modules or circuits including ICs, digital signal processors, and/or ASICs that perform one or more dedicated functions such as encoding and/or decoding MPEG-2 message streams, encrypting/decrypting messages, etc. In some embodiments, CPE 900 contains software and/or hardware making it compliant with various standards and/or platforms such as the OCAP (open cable application platform).

Figure 2:
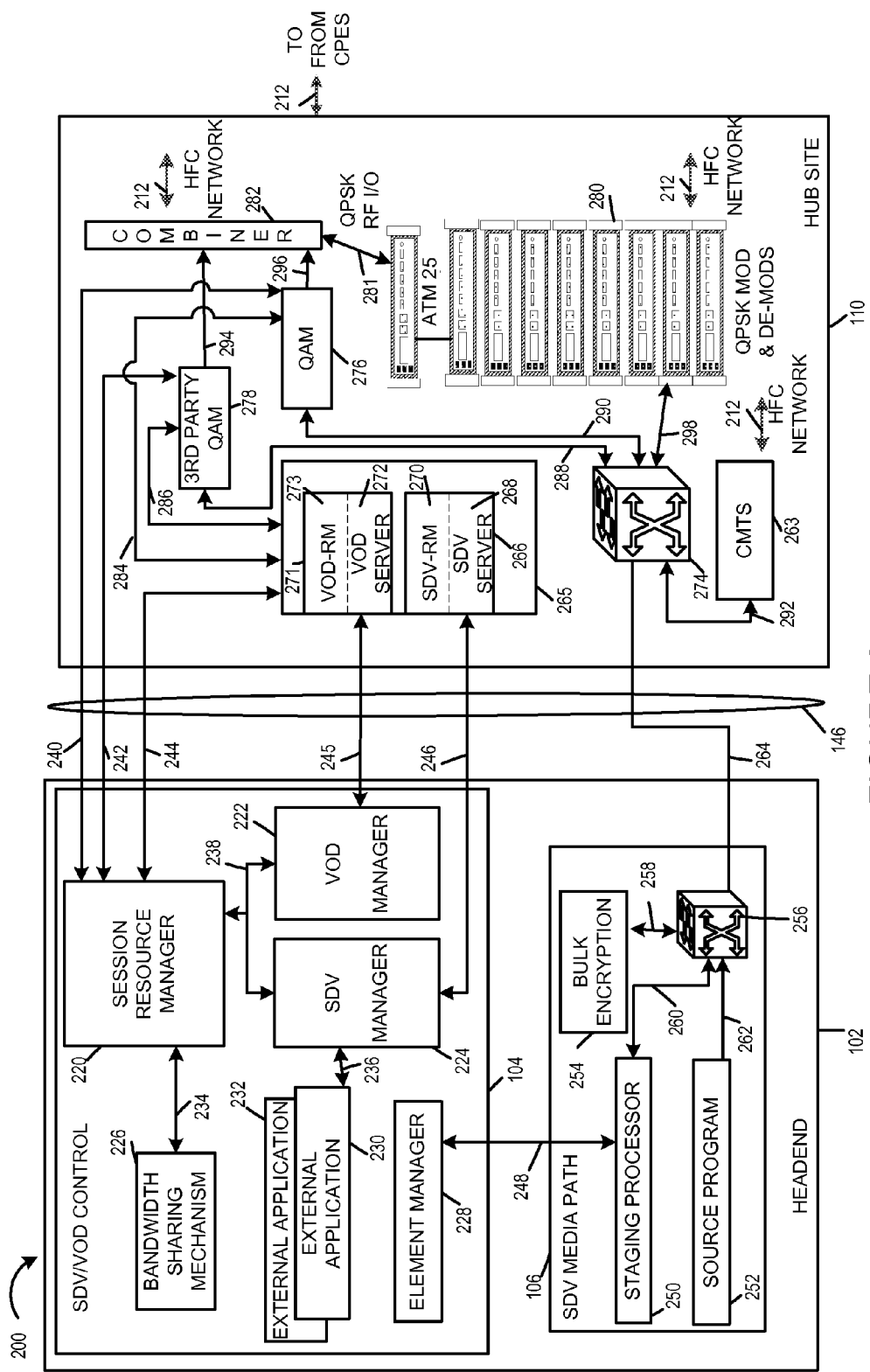
FIG. 2 illustrates portions of exemplary system 100 in greater detail.

FIG. 2 is a diagram illustrating portions of exemplary system 100 in greater detail. Elements of FIG. 2 which are the same or similar to the elements of FIG. 1 are identified using the same reference number. Diagram 200 includes headend 102, set of communication links 146, hub site 1 110, and hybrid fiber coaxial (HFC) network 212.

Exemplary headend 102 in at least one embodiment of the present invention includes a Switched Digital Video/On-Demand Video Control (SDV/VOD Control) module 104 and a Switched Digital Video Media (SDV) module 106. The exemplary SDV/VOD Control module 104 includes a Session and Resource Manager (SRM) module 220 (hereinafter referred to as Session Resource Manager or SRM module), a Switched Digital Video (SDV) Manager module 224, a Video On-Demand Video (VOD) Manager module 222, a Bandwidth Sharing Mechanism (BSM) module 226, an Element Manager Module 228, External Applications 230 and 232, and communication links 234, 236, and 238 for communicating signals, messages, and/or data between various components of the SDV/VOD Control module 104. Link 234 couples Bandwidth Sharing Mechanism module 226 with Session Resource Manager module 220. Link 236 couples External Applications 230 and 232 with SDV Manager module 224. Link 238 couples the SDV Manager 224, Video On-Demand Manager module 222 and the Session Resource Manager module 220. The Session Resource Manager module 220 in some embodiments is responsible for setting up sessions on resources. Exemplary resources, such as a QAM channel or group of QAM channels or the spectrum occupied by one or more QAM channels or partial QAM channels, being capable of carrying a session load depending on the bandwidth of each session request (e.g., standard definition television format, high definition format, etc.). A QAM channel in one embodiment of the present invention being a 6 MHz-wide Quadrature Amplitude Modulated RF carrier that is output by a QAM modulator to group of CPE devices.

Exemplary Switched Digital Broadcast Media Path module 106 includes a staging processor 250, a source program module 252, a bulk encryption module 254, a Switch/Router 256 and communication links 258, 260 and 262 for communicating signals, messages and/or data between various components of the SDV Media Path module 106. Link 258 couples bulk encryption module 254 to Switch/Router 256. Link 260 couples staging processor 250 to Switch/Router 256. Link 262 couples source program module 252 to Switch/Router 256.

Communication link 248 couples staging processor 250 of the SDV Media Path module 106 to Element Manager module 228 of SDV/VOD Control module 104.

Exemplary hub site 1 110 includes the following components: a Switched Digital Video—Resource Manager/Switched Digital Video Server module 266, a VOD-RM/VOD Server module 271, an Edge Switcher module 274, Quadrature Phase Shift Key Modulators and De-Modulators 280, a set or pool of third-party Quadrature Amplitude Modulation Modulators 278, a set of or pool of Quadrature Amplitude Modulation Modulators 276 with encryption functionality, a Combiner 282, a Cable Modem Termination System (CMTS) 263 and various communication links 281, 284, 286, 288, 290, 292, 294, 296, and 298 for communicating signals, messages and/or data between various components of the exemplary hub site 1 110 of system 100.

Communication link 142 of the set of communication links 146, is shown in FIG. 2 as including communication links 240, 242, 244, 245, 246, and 264. Communication links 240, 242, 244, 245, 246 couple various components of the SDV/VOD control module 104 to various components of hub site 1 110. Link 240 couples the Session Resource Manger 220 to the QAM modulators 276. Link 242 couples the Session Resource Manager 220 to the 3rd Party QAM modulators 278. Link 244 couples the Session Resource Manager 220 to the local resource managers and servers in hub site 1 110, e.g., Video On-Demand—Resource Manager 273, Video On-Demand Server 272, Switched Digital Video—Resource Manger 270, and Switched Digital Video—Server 268. Link 245 couples Video On-Demand Manager module 222 with VOD Server 272. Link 246 couples SDV Manager module Server 268 with SDV Server 268. The communication links 240, 242, 244, 245, and 246 are primarily used for communicating control information, signals and messages between the SDV/VOD Control module 104 and the hub site 1 110.

Communication link 264 couples Router/Switcher 256 of SDV Media Path module 106 to Switcher/Router 274 of hub site 1 110. Communication 264 is primarily used to communicate programming content and control information, e.g., IP (internet protocol) data containing MPEG-2 transport streams from the headend 102 to the hub site 1 110.

Exemplary SDV/VOD Control module 104 includes a Session Resource Manager (SRM) module 220 that is connected to the Video On-Demand VOD Manager module 222 and Switched Digital Video (SDV) Manager module 224 via link 238. The Session Resource Manager module 220 performs the initial switched digital video resource pool setup based on requests via link 244 from the Switched Digital Video—Resource Manager module 270 in hub site 1 110. The Switched Digital Video—Resource Manager module 270 and Switched Digital Video Server 268 may be, and in some embodiments of the present invention are, part of a combined Switched Digital Video—Resource Manager/Switched Digital Server module 266 located in the hub site 1 110. The Video On-Demand Resource Manager module 273 and Video On-Demand Server 272 may be, and in some embodiments of the present invention are part of a combined Video On-Demand Resource Manager/Video On-Demand Server module 271. Additionally, in some embodiments the Switched Digital Video—Resource Manager/Switched Digital Server module 266 and Video On-Demand Resource Manager/Video On-Demand Server module 271 are combined and operate on a single server/module 265. This single module 265 operators as the combined resource manager/server for both switched digital video and video on-demand services. In some embodiments, this single combined module 265 is referred to as a universal resource manager or universal edge session resource manager. Links 244, 245, 246, 284 and 286 couple the components of the module 265 with Session Resource Manager module 220, VOD Manager 222, SDV Manager module 224, QAM modulators 276, and 3rd Party QAM modulators 278 respectively.

In some embodiments module 265 or one or more of the VOD-Resource Manager 273, VOD Server module 272, SDV-RM 270, or SDV Server module 268 are located in the headend. In some embodiments, SDV Server module 268 contains content to be inserted into SDV programming streams, e.g., ad insertion. In some embodiments no SDV Server module 268 is used when a switched digital video resource manager module 270 is used. In some embodiments, the switched digital video server is also responsible for performing the switching of switched digital video content.

The Session Resource Manager (SRM) module 220 in addition to performing the initial switched digital video resource pool setup also arbitrates resource allocations between the Switched Digital Video—Resource Manager 270 and the local resource managers of other services sharing the Edge Quadrature Amplitude Modulators including for example, 3rd Party QAM Modulators 278 and QAM Modulators 276 which are located in hub site 1 110. Local resource managers refer to those resource managers located in the hub sites. The Session Resource Manager module 220 will query the Bandwidth Sharing Mechanism module 226 via messages over link 234 in order to determine the parameters for which resources should be allocated when other local resource managers (such as for example the VOD Resource Manager 273) arbitrate for narrowcast bandwidth. The Bandwidth Sharing Mechanism module 226 may, and in some embodiments of the present invention does, exist as a logical component of the Session Resource Manager module 220. In some embodiments of the present invention, the Bandwidth Sharing Mechanism module 226 is embedded in the Session Resource Manager module 220. In some embodiments, the Bandwidth Sharing Mechanism module 226 is not embedded in the Session Resource Manager module 220 but is a separate module that is coupled to the Session Resource Manager module 220.

The Bandwidth Sharing Mechanism module 226 provides an instruction set to the Session Resource Manager module 220, the Switched Digital Video—Resource Manager 270, and other local resource managers such as VOD-Resource Manager 273. The Bandwidth Sharing Mechanism module 220 drives the operation of the Session Resource Manager module 220 at the headend 102 and the local resource managers at the hub sites, e.g., Switched Digital Video—Resource Manager module 270 and Video On-Demand Resource Manager 273, in a global and situational manner.

The Switched Digital Video Manager module 224 configures the system and assigns specific customer premise equipment devices (e.g., CPE devices 116, 118, 120 of FIG. 1) to specific Switched Digital Video Servers (e.g., Switched Digital Video Server module 268). In some embodiments of the present invention, the CPE device communicates to the Switched Digital Video Manager module 224 over hybrid fiber coaxial network 212 through hub site 1 110 when it is first initialized (e.g., at boot up time) and the Switched Digital Video Manager module 224 provides the customer premise equipment device the address of the Switched Digital Server to which it is assigned (e.g., the address of Switched Digital Video Server module 268 of FIG. 2). In some embodiments of the present invention, a file containing primary and standby customer premise equipment device server assignments is carouseled to the CPE device for determining the switched digital server assignment. For example, the carousel mechanism allows a CPE device that has not yet established a two way connection to be initialized.

In some embodiments of the present invention, the Video On-Demand Manager module 222 configures the system and assigns specific CPE devices (e.g., CPE devices 116, 118, and 120) to specific Video On-Demand Servers, e.g., VOD Server 272 of FIG. 2.

In some embodiments of the present invention the Switched Digital Video Server 268 is the termination point for channel change requests from the CPE devices. The Switched Digital Video Server 268 tracks what programs are being delivered to each service group of CPE devices. Upon receiving a request for a program from a CPE device, it verifies the presence of the program, and transmits the tuning information to the requesting CPE device via a message directed to the CPE device and/or via a mini-carousel. If the requested program is not being delivered to the service group to which the requesting CPE device is assigned, the Switched Digital Video Server 268 requests the Switched Digital Video-Resource Manager module 270 to release a recaptured session and re-bind a new session to the service group to carry the requested program.

In the exemplary embodiment, the Switched Digital Video Resource Manager module 270 is a session and local resource manager located in the hub site that is coupled to within the Switched Digital Video Server. In some embodiments of the present invention the Switched Digital Video Resource Manager module is embedded within the Switched Digital Video Server. In some embodiments it is a component in a module 266 that contains both the Switched Digital Video Resource Manager module and the Switched Digital Video Server. The Switched Digital Video—Resource Manager 270 is connected to Edge Quadrature Amplitude Modulation Modulators, 3rd Party QAM Modulators 278 and Quadrature Amplitude Modulation Modulators 276 via links 286 and 284 respectively. The Switched Digital Video—Resource Manager module 270 communicates with the Edge QAM modulators to direct the Edge QAM modulators to perform session release—setup provisioning sequence for resources currently under its local control under the direction of the Switched Digital Video Server 268. This provisioning process results in the Edge QAM modulators joining the multicast group and sending the MPEG-2 packets associated with the program to the appropriate output. In some embodiments the functions described above in connection with the Switched Digital Video Resource Manager module 270 and Switched Digital Video Server 268 are combined into one module 266 as shown in diagram 200 of FIG. 2.

In some embodiments of the present invention, the Switched Digital Video—Resource Manager module 270 will send queries to the Bandwidth Sharing Mechanism module 226 via the links 244 and 234 to establish its operating parameters for service polices and priorities within the switched digital video service. In some embodiments of the present invention, these service policies and priorities are contained in one or more tables or memory locations within the Bandwidth Sharing Mechanism module 226 or associated memory such as memory storage 140 of FIG. 1.

In the exemplary system 100 as further described in FIG. 2, the Session Resource Manager module 220 located in headend 102 and the Switched Digital Video—Resource Manager module 270 located in the hub site are jointly responsible for the dynamic allocation of resources on the edge device and session setup. If the Switched Digital Video—Resource Manager module 270 in the hub site is unable to perform session release—setup process, the Switched Digital Video—Resource Manager 270 negotiates with the Session Resource Manager 220 for additional resources (e.g., bandwidth). These interactions will follow the Bandwidth Sharing Mechanism module's 226 instruction set. The session release—setup process is the process wherein a resource manager releases a session previously bound to a service making the associated bandwidth available for use by another service and then sets up a new session with the available bandwidth binding it the new service requesting the bandwidth.

In some embodiments of the present invention, service priorities are calculated using a ranking scale. Each service has one or more attributes or characteristics sometimes referred to as features that will be valued in terms of classifications. These service priorities can be, and are, used in arbitration to resolve narrowcast bandwidth usage conflicts between new service requests and currently operating services when there is insufficient narrowcast bandwidth available to support both the new service requests and the currently operating services. The arbitration process may be, and in some embodiments of the present invention is performed in the Session and Resource Manager in the headend (e.g., SRM 220). In some embodiments of the present invention, the arbitration process occurs in an edge or local session and resource manager module, such as for example SDV-RM module 270, located in the hub site 1 110. In some embodiments the arbitration process which occurs in the edge session and resource manager is performed in accordance with instructions and/or rules provided by the Bandwidth Sharing Mechanism module 226. In some embodiments the edge session resource manager module utilizes a table of service priorities provided by the bandwidth sharing mechanism in determining who to locate QAM modulators and bandwidth. In some embodiments the edge resource manager, uses information provided by or derived from the CPE devices and/or current service bandwidth allocations in arbitrating the allocation of bandwidth among new service requests and existing services.

In an exemplary embodiment the Bandwidth Sharing Mechanism module 226 functions as a policy generator and priority compiler to resolve bandwidth contention between services or streams within the narrowcast of bandwidth on the HFC network 212. In some embodiments, the Bandwidth Sharing Mechanism module 226 and/or Session Resource Manager module 220 will perform the arbitration process based on rules, policies and/or priorities generated by the Bandwidth Sharing Mechanism module 226. In some embodiments, the Bandwidth Sharing Mechanism 226 will push, e.g., send, at least some if not all of the rules, policies and priorities generated based on subscriber and/or system use cases to the resource managers of various services such as switched digital video and video on-demand. Pushing the rules, policies and priorities to the edge session and resource managers (e.g., SDV-RM module 270 and VOD-RM 273) minimizes unnecessary traffic on the network and improves performance versus relying on components in the headend to conduct the enforcement and arbitration. The Bandwidth Sharing Mechanism's policies dedicate how a service or stream is to operate within its allocated narrowcast bandwidth space and how priorities are to be used for the arbitration of new service requests. The Bandwidth Sharing Mechanism module 226 generates policies for various operating cases and compiles a global priority based on a service's features or attributes. An exemplary attribute is whether or not the service is active or inactive, i.e., whether the service or stream being transmitted has one or more CPE tuners tuned to the service (i.e., active) or whether there are no tuners tuned to the service (i.e., inactive). In some embodiments, the policies and priorities are then pushed or sent by the Bandwidth Sharing Mechanism module 226 to the local resource managers (e.g., via a set of messages sent via link 234 to Session Resource Manager 220 via link 244 to VOD-RM module 273 and SDV-RM module 270) to maximize service efficiency. The policies dictate how a service operates in the narrowcast bandwidth. The policies are applied by the receiving resource managers in certain situations, e.g., when there is insufficient bandwidth to provide all requested services, to determine how the narrowcast bandwidth (dedicated and shared bandwidth) will be allocated, to which services, and how those services will operate.

In some embodiments of the present invention, various associated service components, e.g., VOD-RM module 273 and SDV-RM module 270, enforce policies generated by the Bandwidth Sharing Mechanism module 226 by receiving the policies from the Bandwidth Sharing Mechanism module 226 at a specified time and/or by querying the Bandwidth Sharing Mechanism module 226 either before or upon the occurrence of a bandwidth conflict situation requiring resolution.

In the exemplary embodiment, the Bandwidth Sharing Mechanism module 226 contains a rules engine (e.g., software rules engine) that generates the bandwidth sharing policies based at least in part on information derived, provided, or obtained about the various services in use. In some embodiments, the Bandwidth Sharing Mechanism module 226 queries various components of the headend, hub site and/or CPE devices to obtain at least some of the information that will be utilized in generating one or more of the bandwidth sharing policies. For example, the Bandwidth Sharing Mechanism module 226 may, and in some embodiments does, send messages to the SDV Manager module 224 via Session Resource Manager 220 and links 234 and 238 to determine how many and which CPE devices are assigned to a particular SDV service group for use in determining how much bandwidth should be allocated to the service group. In some embodiments, the Bandwidth Sharing Mechanism module 226 queries or is provided information regarding the type and capabilities of the CPE devices connected to the HFC network 212 and are associated with specific service groups. For example, the Bandwidth Sharing Mechanism module 226, may, and in some embodiments, does obtain information about the number of tuners supported by the various CPE devices in a service group and in some instances statistics regarding the historical subscriber usage of services in certain situations upon which policies can be based for the efficient usage of bandwidth in similar future situations. E.g., policies can, and are generated in some embodiments, based on the subscribers past subscriptions and viewership of highly publicized sporting events such as NFL's super bowl football game, championship boxing matches and world series baseball games.

In the exemplary embodiment, the rules engine of the Bandwidth Sharing Mechanism module 226 creates a table of states and assigns a priority or policy to each of the services for which narrowcast bandwidth sharing is to be enforced based on the parameters collected regarding that service. This is referred to as the service state.

Existing services and new services are assigned a compiled priority and/or policy based on certain parameters, and the service's operating state. This compiled priority and/or policy is created and controlled by the Bandwidth Sharing Mechanism module 226. In the exemplary embodiment there are two operating states: 1.) policy of operation and 2.) priority of resolution.

The policy of operation state refers to when a service is being delivered on the narrowcast bandwidth. At this time the service is declared as in operation. While in operation a certain policy is assigned to that service. This assigned policy dictates how that service is handled within its operation.

The priority of resolution operation state refers to a new service operating state. Rules generated by the Bandwidth Sharing Mechanism module 226 are used to arbitrate a condition among a new service request to be delivered in the narrowcast bandwidth and already existing service. In the exemplary embodiment, the objective is to have the narrowcast bandwidth in use at all times or as close to continuously as possible so as to make the most efficient use of the narrowcast bandwidth possible. In some embodiments, more than 90% of the dedicated switched digital video and shared bandwidth are continuously in use. In some embodiments to achieve this objective, whenever there is unused narrowcast SDV or sharable bandwidth available, a SDV service will be provided on the unused bandwidth so that should a CPE device request the SDV service it will be readily available without any delay in the provisioning of the service. Having narrowcast bandwidth in use at all times or as close to continuously as possible is sometimes referred to as max mode and also allows 2-way CPE devices to view currently streaming content even if the CPE devices upstream connections are temporarily inoperative. Such CPE devices are sometimes referred to as non-responders. This allows viewing of a stream by a non-responding CPE device to continue after the original requesting CPE device has left the stream, and also keeps the QAM pool filled with the most popular programming in a given service group to allow non-responders the best possible selection during upstream outages. In some embodiments, inactive switched digital video services are placed onto unused dedicated switched digital video and shareable bandwidth to have the narrowcast bandwidth full or nearly full as possible for a majority of the time. In some embodiments, an inactive switched digital video service without currently active viewers is placed onto the unused bandwidth. Because of bandwidth fragmentation, it may not always be possible to have all of the shareable and dedicated switched digital video bandwidth occupied continuously.

In those embodiments in which the narrowcast bandwidth is full or nearly full for a majority of the time and/or all of the time, there are three arbitration states: 1.) replacing an existing inactive service, 2.) replacing an existing active service, and 3.) denying a service. A new service request can be initiated by the subscriber, the operator, or the service itself. Therefore it is important to assign a priority of resolution to the new service that is being delivered. And, based on the arbitration state, the Bandwidth Sharing Mechanism module 226 enforces a separate rule for each state that the new service will be in and arbitration occurs with the existing service's operating priority.

In an exemplary embodiment of the present invention, the Bandwidth Sharing Mechanism module 226 characterizes the existing bandwidth prior to generating and assigning bandwidth partition policy, bandwidth usage policy, and a bandwidth sharing enforcement policy based on the following criteria. Bandwidth partitioning will be separated into non-sharable bandwidth and sharable bandwidth.

Non-sharable bandwidth contains an equipment partition and a statistical or logical partition. With respect to the equipment partition, if a portion of the modulators (e.g., QAM modulators 276 or 278 of FIG. 2) do not support bandwidth sharing, then those modulators are designated to operate within the silo of the service to which they are assigned and the service's policy and priorities. For example, if the modulator is equipment that is dedicated to providing bandwidth in support of Switched Digital Video service then the modulator will only support those switched digital video service and will operate within the policy and priority of the switched digital video service it is dedicated to supporting. With respect to the statistical or logical partition, if a portion of the modulators (e.g., QAM modulators 276 or 278 of FIG. 2) are statistically or logically partitioned to be non-sharable, then those modulators are dedicated to operate within the policy and priorities requirements of the service to which they have been statistically or logically partitioned to support, e.g., switched digital video or video on-demand. Only a service operating in this dedicated non-sharable space is able to replace another service in this space. For example, if one of the QAM modulators in 3rd Party QAM modulators 278 is logically partitioned to only provide bandwidth to support video on-demand services then only another video on-demand service request can replace an existing video on-demand service. The dedicated video on-demand bandwidth controlled by the modulator cannot be used to provide other services such as switched digital video services. The Bandwidth Sharing Mechanism module 226 will determine the modulators capabilities by querying the modulators (e.g., 3rd Party QAM modulators 278 and QAM modulators 276) by sending messages via Session Resource Manager 220 via links 234, 240, and 242. In some embodiments, the Bandwidth Sharing Mechanism module 226 will determine the modulators capabilities by querying the equipment responsible for configuring the system and/or controlling the modulators such as the SDV Manager 224, Video On-Demand Manager 222, VOD-RM 273 and the SDV-RM 270.

The sharable bandwidth of the exemplary embodiment of the present invention contains a logical partition. The sharable bandwidth is designated by querying the appropriate resource manager, e.g., the VOD-RM 273 or the SDV-RM-270.

Diagram 400 of FIG. 4 shows how the total bandwidth 410 may be, and in some embodiments is, partitioned into three portions. A first portion of the total bandwidth is non-sharable bandwidth dedicated to providing Video On-Demand services 434, a second portion of the total bandwidth is non-sharable bandwidth dedicated to providing Switched Digital Video services 418, and a third portion of the total bandwidth is shared bandwidth that is used to provide both switched digital video and video on-demand services. The dedicated Video On-Demand bandwidth 434 may be, and in some embodiments of the present invention, is a result of equipment partitioning such as QAM modulators that do not support bandwidth sharing being and/or the result of logical or statistical partitioning. For example, the system may be, and in some embodiments, is configured to have a certain amount of QAM modulators dedicated to providing bandwidth to video on-demand services because it is known that a certain amount of the bandwidth is likely to be in continuous use. As a result the system assigns QAM modulators that are not capable of sharing bandwidth and if necessary logically partitions additional QAM modulators to ensure there is sufficient bandwidth to meet the anticipated video on-demand requests.

As discussed above, the Bandwidth Sharing Mechanism module 226 also characterizes the bandwidth usage. Bandwidth usage is characterized as either non-sharable bandwidth or sharable bandwidth. With respect to non-sharable or dedicated bandwidth, new service requests for each respective service first seeks bandwidth within the non-sharable bandwidth space prior to seeking bandwidth in the sharable bandwidth space. For example, a new service request for a video on-demand service first seeks available bandwidth within the non-sharable or dedicated switched digital video bandwidth 434 prior to seeking bandwidth within the sharable bandwidth space 424. Similarly, a request for bandwidth to support a new switched digital video service first seeks available bandwidth within the non-sharable or dedicated switched digital video bandwidth 418 prior to seeking bandwidth within the sharable bandwidth space 424. With respect to sharable bandwidth, it is an objective to have all sharable bandwidth be in use at all times. This serves to reduce non-responder impacts in conjunction with the switched digital video channel map, e.g., when a subscriber tunes to a service that is being offered but is not being transmitted it will be readily available to be tuned to instead of having to be allocated and supplied. As all or as much sharable bandwidth as possible is in use at all times, new requests for service follow appropriate arbitration priority to replace an existing service. That is a request for service with a higher priority than an existing service's priority will replace the existing service with the lower priority. In FIG. 4, bandwidth segment 426 of the shared SD/VOD bandwidth is a segment of bandwidth that is being used to provide a switched digital video service to which no CPE devices are currently tuned. When switched digital video service, e.g., television program, is transmitted to which no CPE devices are tuned the service is referred to as an in-active service. There are 10 in-active bandwidth SDV services 414 using shared SD/VOD bandwidth shown in the exemplary bandwidth allocation shown in FIG. 4.

With respect to characterizing the bandwidth sharing enforcement policy, sharable bandwidth is bandwidth space that is available to all or some services (e.g., video on-demand and switched digital video services) for delivery of those services to CPE devices. FIG. 4 shows exemplary shared SD/VOD bandwidth 424 with segments of the bandwidth in use for providing active SDV services (e.g. 422), inactive switched digital video services (e.g., 426), and video on-demand services (e.g., 428). The Bandwidth Sharing Mechanism module 226 creates the policy and priority profiles for placement or usage of the shared bandwidth for existing and new services.

The Bandwidth Sharing Mechanism module 226 in an exemplary embodiment of the present invention creates or generates global policies based on information and/or parameters that are derived, queried from other components of the system 100 or made available to the Bandwidth Sharing Mechanism module 226 from other components of the system 100. Exemplary parameters include CPE device type, inactivity timeout, service state classifications, and blocking of service occurrences.

Exemplary CPE device type parameter is information as to whether a CPE device, e.g., CPE device 116, is one-way or two-way device. One-way devices are not capable of receiving interactive services. As one-way devices cannot access sharable services, the bandwidth sharing policies and priorities are not applicable to one-way devices. Two-way CPE devices are capable of receiving interactive services and accessing sharable bandwidth. As a result, the two-way CPE devices generally are expected to adhere to the defined bandwidth sharing policies and priorities of the Bandwidth Sharing Mechanism module 226. In some embodiments of the present invention, the system is designed such that the two-way CPE devices must adhere to the defined bandwidth sharing policies and priorities of the Bandwidth Sharing Mechanism module 226.

The two-way CPE devices which are to adhere to the Bandwidth Sharing Mechanism module 226 policies and priorities can be, and in some embodiments of the present invention, are further classified such as for example as single tuner devices, multi-tuner devices, and/or devices with recording capabilities. Single tuner devices provide only main screen viewing. Multi-tuner devices provide picture-in-picture (PIP) and main screen viewing. In some devices, one physical tuner is capable of acquiring multiple MPTSs (multiple program transport streams) and operating as if the single tuner were separate discrete tuners. Such tuners are typically referred to as wideband tuners. They are common in DOCSIS-3.0 modems and are currently being introduced into set-top boxes. Though these devices only have a single physical tuner they are classified as multi-tuner devices. Devices with recording capabilities provide recording, PIP and main screen viewing. Additional exemplary device classifications of two-way devices can, and in some embodiments of the present invention do, include video format type and encryption type the device is capable of utilizing.

An exemplary video consumption policy that the Bandwidth Sharing Mechanism module 226 may, and in some embodiments of the present invention, does generate is a policy concerning notifications. For example, notifications to the subscriber must be made available in the appropriate rendering format the subscriber is currently viewing (e.g., high definition television format or standard definition television format) when the video is consumed on the main screen; notifications to the subscriber will not be displayed when video is consumed in the PIP screen; and notification to the subscriber will not be displayed when video is consumed in recording mode.

In some embodiments of the present invention, the Bandwidth Sharing Mechanism module 226 generates a timeout policy based at least in part on an inactivity timeout parameter. The inactivity timeout parameter is a designation of a period of time when a particular in use service in a service group is not demonstrating any viewership activity as measured by an activity event indicator. In some embodiments the timeout interval is configurable. Exemplary inactivity timeout configuration parameters include default timeout interval, network service type timeout interval, time of day timeout interval, and subscriber timeout interval.

In some embodiments, there is a default timeout interval or period of time after which the service being evaluated is designated as being inactive for a particular service group. In some embodiments, the default timeout is configurable or derived to 0-24 hours in a minimum of time increments such as for example ½ hour increments.

In some embodiments of the present invention, there is a configurable network service type timeout interval and a policy that is enforceable based on the network service type. This allows the Bandwidth Sharing Mechanism module 226 to generate individual time out interval policies on a service type basis. For example the network service providing the discovery channel can, and in some embodiments does, have a four hour time out interval while the network service that provides ESPN can, and in some embodiments does, have a 5 hour timeout interval. In those exemplary cases wherein the discovery channel service has a four hour time out interval and the ESPN service has a five hour timeout interval, after four hours have passed without viewership activity on the discovery channel the discovery channel service is designated as inactive. However, five hours of inactivity on the ESPN service is required before it will be designated as an inactive service.

In some embodiments, there is a time of day timeout interval parameter and policy. An exemplary time of day timeout interval policy is one that is enforceable based on the time of day. For example, the Bandwidth Sharing Mechanism module 226 can configure or set for different times of the day a different time out interval indicating how long a lack of viewership must occur before a service is designated as inactive at a specific time of the day. For example, the primetime timeout period of services can, and in some embodiments of the present invention, is less than other times of the day such as early afternoon.

In some embodiments, there is a time out interval parameter and policy that can, and is, configurable and enforceable on an individual subscriber basis. For example, a chronic non-button pusher subscriber (e.g., sports bar which does not change channels often so as to not interrupt viewing activity) can be, and in some embodiments is, configured to have a longer timeout interval than other subscribers. As the subscriber time out interval policy is not a global policy for a service group, it is necessary to determine if the subscriber for which the timeout policy has been established is tuned to the service of interest when making a determination as to whether the service should be designated as an inactive service based on the expiration of the timeout interval without activity.

In some embodiments of the present invention the Bandwidth Sharing Mechanism module 226 generates policies based on a service state classification parameter. The service state classification parameter classifies services in one of two states: active and inactive. A service is in an active state when the service is in service and registered viewers are active on the service. A service is in an inactive state when the service has been classified as inactive; or when no viewers are currently on registered using the service. An exemplary situation in which a service may be, and in some embodiments is, classified by system, e.g., the system's switched digital video resource manager, as being inactive is when the only CPE device tuned to the service has been inactive for a period of time in access of a default timeout interval.

In some embodiments, the Bandwidth Sharing Mechanism module 226 generates a bandwidth blocking occurrence policy based on parameters associated with service blocking occurrences. For example, the Bandwidth Sharing Mechanism module 226 can, and in some embodiments does, generate and initiate alerting policies based on approaching or exceeding one or more threshold levels of occurrences of service blocking including individual services and groups of services. For example, the Bandwidth Sharing Mechanism module 226 can, and sometimes, does generate a blocking occurrence alert policy, in which blocking should occur less than a certain percentage of the operating year for switched digital video service, e.g., 2% of the operating year. The policy may, and in some embodiments of the present invention, does require tracking of occurrences of blocking of the service by the service group, e.g., by the switched digital video service manager and/or switched digital video server supporting the service group. When occurrences of blocking of the service in a service group exceeds the threshold set an alert is generated and made available to the system operator to take appropriate actions to reduce the occurrences of blocking. In some exemplary embodiments, the alert may be, and is, generated by the Switched Digital Video-Resource Manager module 270 and transmitted to the Session Resource Manager 220 via link 244. The Session Resource Manager may then instruct the SDV Manager 224 via messages sent over link 238 to assign additional QAM modulators, e.g., from 3rd Party QAM modulators 278, to support the service group experiencing service blocking above the threshold level. In some embodiments, the Session Resource Manager module 220 may, and does communicate, the service blockage alert to the Bandwidth Session Resource Manager module 226 via link 234 wherein in addition to or in the alternative to adding additional QAM modulators to support the service group, the Bandwidth Sharing Mechanism module 226, may, and sometimes does, reassign service priorities and policies to address the service blocking issue and push the priorities and policies out to the Switched Digital Video—Resource Manager module 270 supporting the service group experience the service blocking issue. The Bandwidth Sharing Mechanism module 226 may, and in some embodiments does, also set new blocking thresholds and/or alerts to monitor the occurrences of blocking on the service group experiencing service blocking issues. In some embodiments of the present invention, the Bandwidth Sharing Mechanism module 226 must generate and initiate alerting policies based on service blocking occurrences.

In some embodiments of the present invention, service priorities are calculated using a ranking scale. A service has a number of characteristics or features that are valued in terms of classifications. These service priorities are then used in arbitration of new service requests versus existing operating services for limited resources, e.g., narrowcast bandwidth and associated modulators. In some embodiments, the arbitration of new service requests versus operating services occurs at the edge resource managers, e.g., Switched Digital Video—Resource Manager 270 which reduces delays in resolving conflicts and hence in providing services, reduces traffic between the headend 102 and the hub sites, e.g., hub sites 110 thru 112, and offloads processing from the headend, e.g., Session Resource Manager module 220.

In some embodiments there are both global conflict resolution mechanisms or rules and service conflict resolution mechanisms or rules. One exemplary global conflict mechanism or rule is that when a resource manager, e.g., SDV—Resource Manager 270, needs to arbitrate bandwidth allocation between a new service request and the existing operating services because there is insufficient narrowcast bandwidth available to fulfill the new service request, the resource manager, can, and in some embodiments does, use a priority ranking designation to determine which service will have priority over another. For example, a paid on-demand viewing event service may, and in some embodiments does, have a higher priority than a free on-demand viewing event service. Similarly, a service with many active users may, and in some embodiments does, have a higher priority than another service with only one active user.

Once the global conflict resolution mechanisms or rules have been exhausted and a new service request is still unable to secure narrowcast bandwidth then the resource manager, e.g., SDV-Resource Manager 270, uses a compiled service priority to determine arbitration between the new service request and existing operating services. In some embodiments, where a new service request and an existing service request have equal compiled priorities the existing active service will have priority and will continue to be provided the bandwidth necessary to continue service so as to not interrupt current subscribers current viewing. In some embodiments, a service's compiled priority is the total of each of the individual ranked service characteristics or features as described below. The higher the compiled priority number the higher the priority of the service. The compiled service priorities may be, and in some embodiments is, determined dynamically by the resource manager, e.g., Switched Digital Video—Resource Manager module 270, performing the arbitration operation to determine how the narrowcast bandwidth should be allocated.

In an exemplary embodiment of the present invention, the Bandwidth Sharing Mechanism module 226 generally generates the global and service conflict resolution mechanisms/rules and provides them to the Session Resource Manager module 220, and the local resource managers included in the hub sites such as the Switched Digital Video—Resource Manager module 270 and Video On-Demand—Resource Manager module 273.

In an exemplary embodiment of the present invention, the Bandwidth Sharing Mechanism module 226, assigns priorities to each service based on global and conditional designations. A priority designation that impacts a number of individual priorities in a global manner for the entire narrowcast bandwidth are referred to as global priority classifications and can include for example such classifications as: operating service (i.e., a service currently in operation), new service, and time of day. The Bandwidth Sharing Mechanism module 226 can, and in some embodiments of the present invention does, assign a specific priority for each individual service feature such as for example: type: Stream Type, Programming Package Type, Stream Format Type, Tuner Types, Viewership Type, Network, and Program. Sample service priority designations and rankings are shown in tables 1000, 1100, 1200, 1300, 1400, and 1500 of FIGS. 10, 11, 12, 13, 14 and 15 respectively. These service priority designations may be, and in some embodiments of the present invention are, generated by the Bandwidth Sharing Mechanism module 226 and stored in memory included in or associated with the Session Resource Manager module 220 in the headend and/or the SDV-RM 270 in hub site 1 110. In various embodiments, the priority level service designations are used by one or more of the session resource managers in determining and assigning priorities to new service requests and existing operating services based on global and service specific classifications for narrowcast bandwidth arbitration purposes. For these examples, streams refer to transport streams and each service to be prioritized correlates to a single stream. It will be appreciated that a request for a new service, e.g., new switched digital video service, will require a new stream while an existing operating service or stream is one that is currently being provided.

Table 1000 of FIG. 10 provides sample exemplary priority level designations based on the global priority classification of whether the service is an existing operating service or a new service and the service specific priority classification of stream type. Each row 1012, 1014, 1016, and 1018 of table 1000 correlates the priority to be assigned to a service based on its stream type shown in column 1002 and whether that stream is a currently operating stream shown in column 1004 or a new stream shown in column 1006. Row 1012 corresponds to a service requiring a new switched digital video stream, row 1014 corresponds to a service that is an inactive switched digital video stream (I-SDV) that is a stream that is currently being provided and is hence utilizing bandwidth but to which no CPE devices are currently tuned. Row 1016 corresponds to a service which has an active switched digital video stream that is a stream currently in operation utilizing bandwidth and to which at least one or more CPE devices are currently tuned based on the most recent tuning information obtained from the CPE devices within the service group. Row 1018 corresponds to a service for video on-demand. An example of how table 1000 correlates service priority values to services is now provided. The service priority value based on stream type for a currently operating video on-demand service is found in the table 1000 entry for row 1018 column 1004 which correlates to VOD 1018 and currently operating stream 1004. It is a value of 7. The service priority value based on stream type for a new video on-demand service is found in the table 1000 entry for row 1018 column 1006 which correlates to VOD 1018 and new stream 1006. It is a value of 5. The currently operating VOD service has been assigned a higher priority than a new VOD service request. In some embodiments of the present invention, if there was insufficient bandwidth for both the currently operating VOD service and the new VOD service request, the session resource manager would resolve the conflict by providing the bandwidth to the existing operating VOD service because it has a higher priority value than the new VOD service request.

Table 1100 of FIG. 11 provides sample exemplary priority level designations based on the global priority classification of whether the service is an existing operating service or a new service and the service specific priority classification of programming package type. Each row 1112, 1114, 1116, 1118, 1120, 1122, 1124, 1126, 1128, and 1130 of table 1100 correlates the priority to be assigned as a numerical value to a service based on its programming package type shown in column 1102 and whether that service is an operating service currently using an operating stream 1104 or a new service that requires a new stream shown in column 1106. The exemplary programming package types provided are broadcast tier (simulcast) row 1112, cable tier (simulcast) row 1114, digital tier row 1116, sports & games tier row 1118, digital movie tier row 1120, premium tier row 1122, Spanish/international tier row 1124, sport packages (e.g., NHL, NBA, NASCAR, NFL) row 1126, high definition TV (HDTV) tier row 1128, and pay per view (PPV) event row 1130. A numerical service priority value is assigned to each of these service programming package types based on whether the service is an existing service or a new service requiring a new stream. In the example shown in table 1100 of FIG. 11, the higher the numerical value the higher the priority ranking.

Table 1200 of FIG. 12 provides sample exemplary priority level designations based on the global priority classification of whether the service is an existing operating service or a new service and the service specific priority classification of type of video on-demand service. Each row 1208, 1210, 1212, 1214, and 1216 of table 1200 correlates the priority to be assigned as a numerical value to a service based on its video on-demand service type shown in column 1202 and whether that service is an operating service currently using an operating stream 1204 or a new service that requires a new stream shown in column 1206. The exemplary video on-demand service types provided are Free On-Demand (FOD) row 1208, Subscription On-Demand (SOD) row 1210, Movies On-Demand (MOD) row 1212, Premium On-Demand (POD) row 1214, and Start Over On-Demand (SO) row 1216. A numerical service priority value is assigned to each of these service video on-demand types based on whether the service is an existing service or a new service requiring a new stream. In the example shown in table 1200 of FIG. 12, the higher the numerical value the higher the priority ranking.

Table 1300 of FIG. 13 provides sample exemplary priority level designations based on the global priority classification of whether the service is an existing operating service or a new service and the service specific priority classification of format type. Each row 1308 and 1310 of table 1300 correlates the priority to be assigned as a numerical value to a service based on its format type shown in column 1302 and whether that service is an operating service currently using an operating stream 1304 or a new service that requires a new stream shown in column 1306. The exemplary format types provided are Standard Definition (SD) row 1308 and High Definition (HD) row 1310. A numerical service priority value is assigned to each of these service format types based on whether the service is an existing service or a new service requiring a new stream. In the example shown in table 1300 of FIG. 13, the higher the numerical value the higher the priority ranking.

Table 1400 of FIG. 14 provides sample exemplary priority level designations based on the global priority classification of whether the service is an existing operating service or a new service and the service specific priority classification of tuner priorities. Each row 1408, 1410, and 1412 of table 1400 correlates the priority to be assigned as a numerical value to a service based on the tuner priority of the requesting entity and whether that service is an operating service currently using an operating stream 1404 or a new service that requires a new stream shown in column 1406. The exemplary tuner priorities are Live Tuner—Main Screen row 1408 (e.g., service either provided or to be provided to STB live tuner on which the video is provided to the main screen), Live Tuner—Picture in Picture (PIP) row 1410 (e.g., service either provided or to be provided to STB live tuner for picture in picture display), recording tuner 1412 (e.g., service either provided to or to be provided to STB recording tuner). A numerical service priority value is assigned to each of these tuner types based on whether the service is an existing service or a new service requiring a new stream. In the example shown in table 1400 of FIG. 14, the higher the numerical value the higher the priority ranking.

Table 1500 of FIG. 15 provides sample exemplary priority level designations based on the global priority classification of whether the service is an existing operating service or a new service and the service specific priority classification of viewership. Row 1506 of table 1500 correlates the priority to be assigned as a numerical value to a service based on the active subscribers of the service and whether the service is an operating service currently using an operating stream 1504 or a new service that requires a new stream shown in column 1506. The exemplary active subscriber priority is number or count of tuners 1504 currently tuned to the service stream. For new services the priority is set to 0 as there will be no active subscribers tuned to the service.

When there is insufficient bandwidth to support a new service request and global conflict resolution rules do not resolve the conflict, service conflict resolution rules may, and in some embodiments, are applied. In such situations, a compiled service priority is generated for the new service and the existing services. This operation may be, and in some embodiments, is performed by the resource manager responsible for resolving the service conflict. The compiled service priority is the sum of the total of each of the assigned priorities for the service based on the service priorities features or attributes. For example, a new request by one CPE device's live main tuner for a premium on-demand high definition format movie would have the following priority values based on the exemplary priority values provided in tables 1000, 1100, 1200, 1300, 1400, and 1500. Stream type is new stream on-demand so the priority value from table 1000 is 5. The programming package type is new stream premium tier so the priority value from table 1100 is 7. The On-Demand type is new stream premium on-demand so the priority value from table 1200 is 7. The format type is new stream standard definition television format so the priority value from table 1300 is 4. The tuner priority is new stream live tuner—main screen so the priority from table 1400 is 4. The viewership priority which is the number of active subscribers is 0 from table 1500 as this is a request for a new stream and therefore there are no active viewers. The compiled service priority for this exemplary new service request is 27 which is the sum or total of the individual attribute or feature priority values for the requested service (i.e., 5+7+7+4+4+0=27). This compiled service priority value is then compared to the compiled priority values of each of the existing operating services with which it is competing for narrowcast bandwidth within the service group. The operating service compiled service priority value can be, and in some embodiments is, determined in the same manner as the new service request compiled priority value described above. For example using the sample priority values of tables 1000, 1100, 1300, 1400, and 1500, an operating service that has the following features: active switched digital video stream type (priority=7), sports & game tier type (priority=7), standard definition format type (priority=5), live tuner—main screen tuner type (priority=5), and 10 active subscribers (priority=10 tuners) has a compiled service priority value of 34. As 34 has a higher priority value than the compiled priority value of the new service request which was 27. The new service request is denied and the existing operating service maintains use of the bandwidth in content. Using the sample priority values of tables 1000, 1100, 1300, 1400, and 1500, another operating service that has the following features: active switched digital video stream type (priority=7), sports & game tier type (priority=7), standard definition format type (priority=5), live tuner—main screen tuner type (priority=5), and 1 active subscribers (priority=1 tuner) has a compiled service priority value of 25. In this case the new service request has a compiled priority of 27 and the operating service to which it is compared has a compiled service priority of 25 so the bandwidth would be reallocated to new service replacing the existing service through a session release and set-up process.

The compiled service priority values for operating services may be, and in some embodiments is, determined dynamically at the time of bandwidth arbitration. In some embodiments, the compiled service priority values for operating services is determined statically and stored in memory in the local resource manager or associated therewith for later use such as for use in the bandwidth arbitration process. In some embodiments, some of the priority values for an operating service which do not vary over time such as for example service programming package type, on-demand type, and format type are determined when the service is placed into operation and stored in memory for later use such as for use in determining the operating service's compiled priority. In some embodiments, the priority values which vary over time for an operating service are determined periodically and stored in memory for use in determining the service's compiled priority when a conflict arbitration process occurs.

An example of the software messaging that enables the video on-demand and switched digital video service bandwidth sharing is now discussed in connection with table 700 and 800 of FIGS. 7 and 8. The new software messaging addresses the video on-demand (VOD) service group IP discovery process and the video on-demand session resource manager IP address to provide a tighter alignment of the narrowcast bandwidth capacity. Additionally, by changing by the video on-demand session resource manager IP address discovery mechanism, provides the ability to shift more gracefully away from using the legacy out of band (OOB) IP networks (e.g., QPSK Modulators and Demodulators 280 of FIG. 2) to communicate the video on-demand service group IDs to the CPE devices. This new messaging scheme provides a mechanism to distribute the session and resource manager process throughout the system which will reduce the single points of failure in the video on-demand sub-system.

Figure 5:
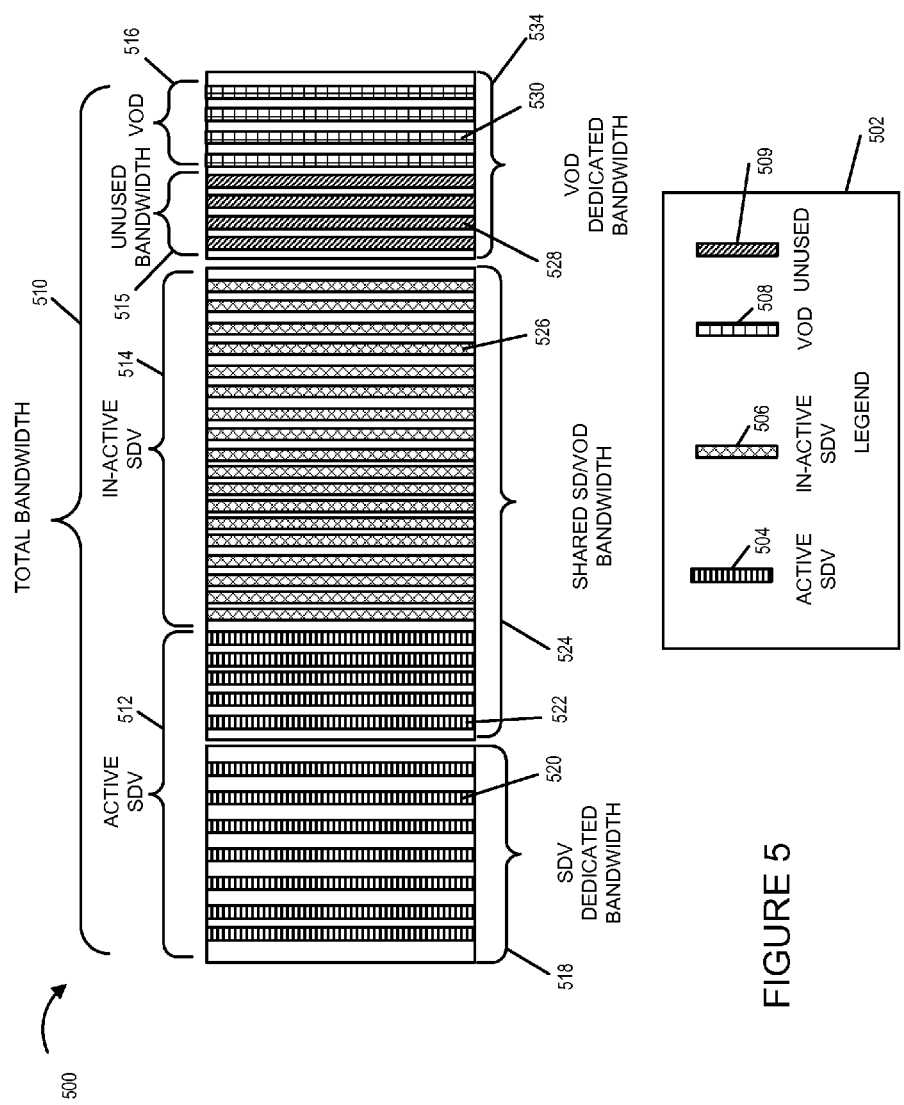
FIG. 5 illustrates an exemplary allocation of bandwidth in accordance with one embodiment of the present invention.
Figure 6A:
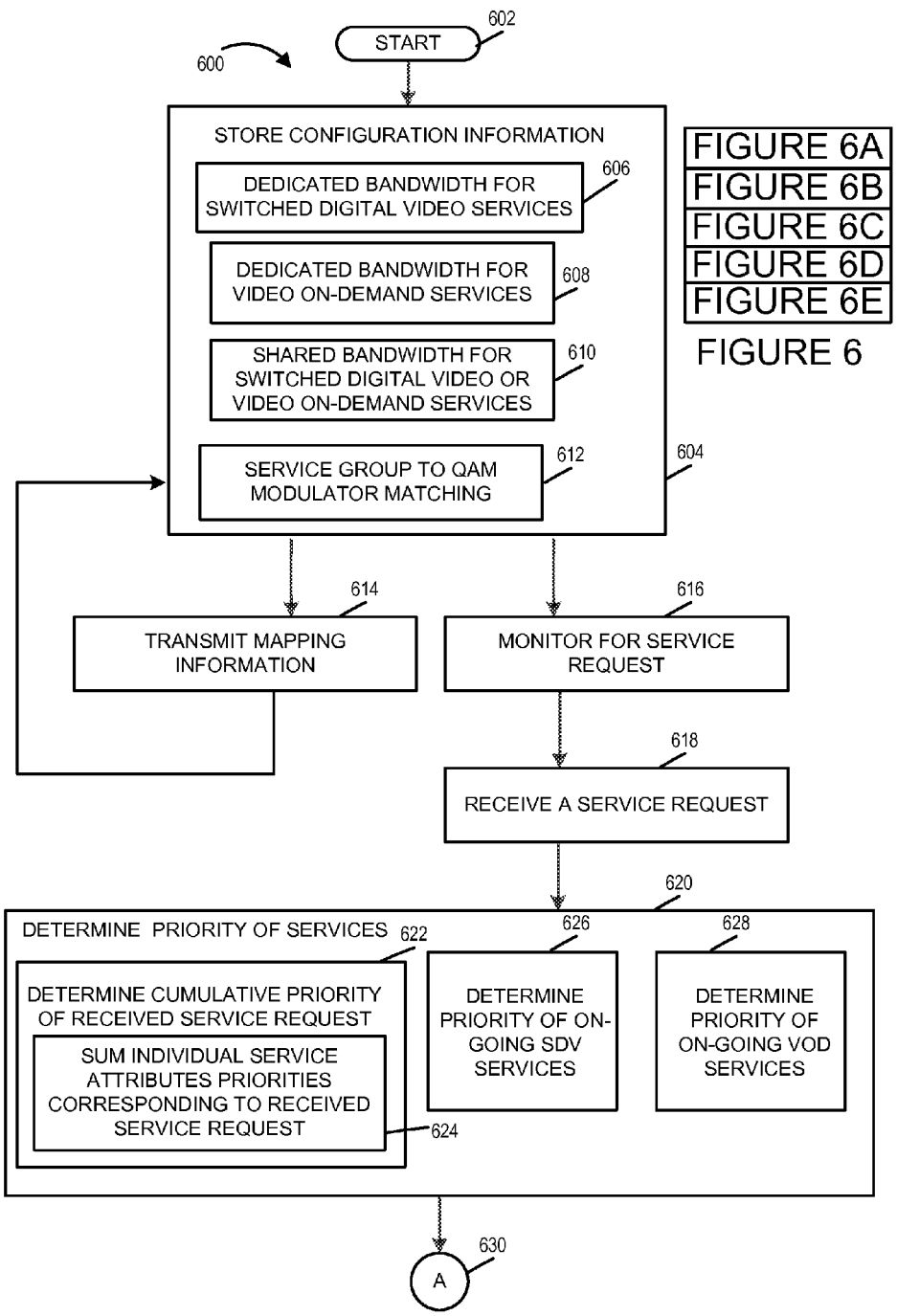
FIG. 6, which comprises the combination of FIGS. 6A, 6B, 6C, 6D and 6E, illustrates the steps of an exemplary method for providing bandwidth resource allocation in accordance with one embodiment of the present invention.
Figure 6B:
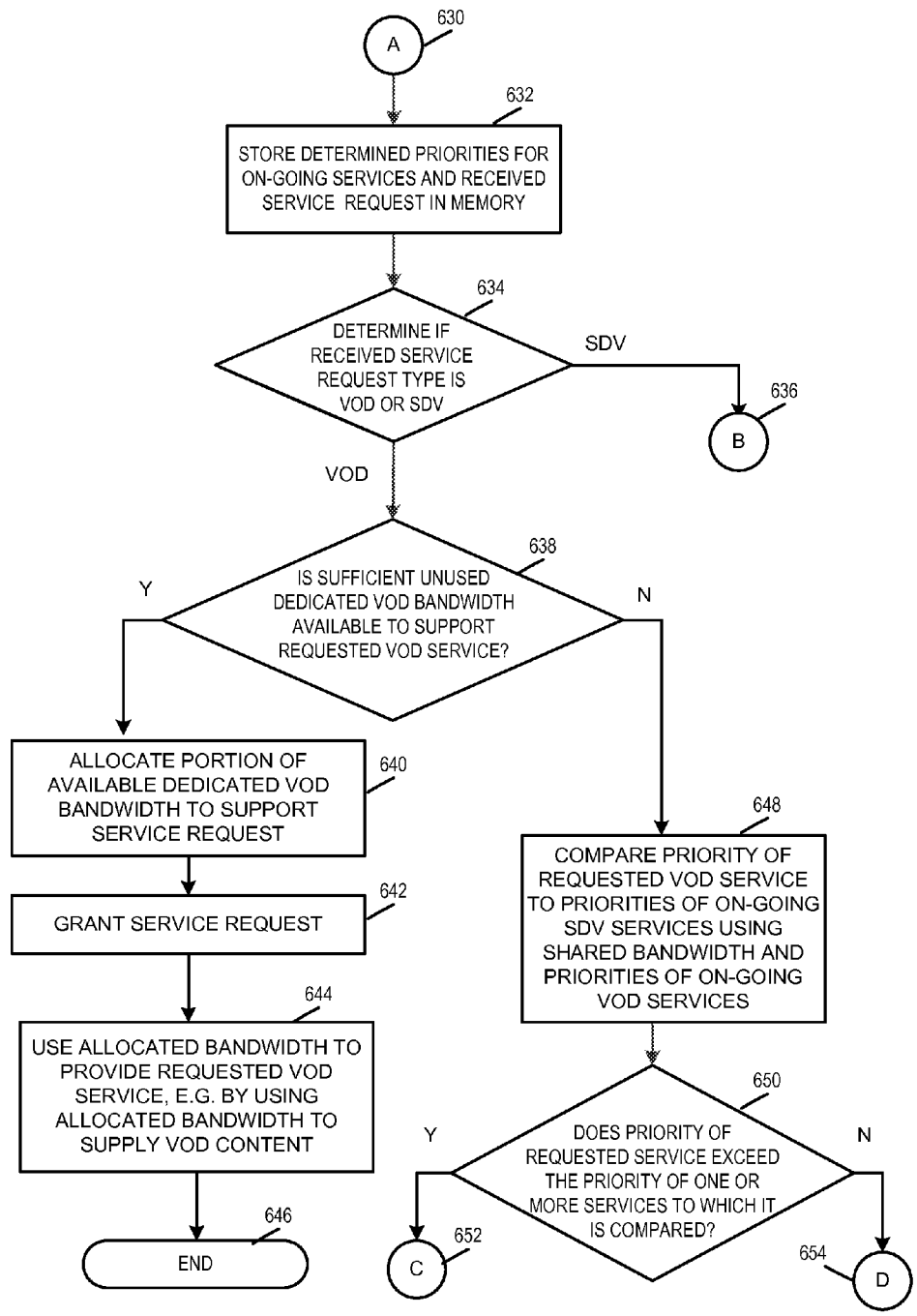
Figure 6C:
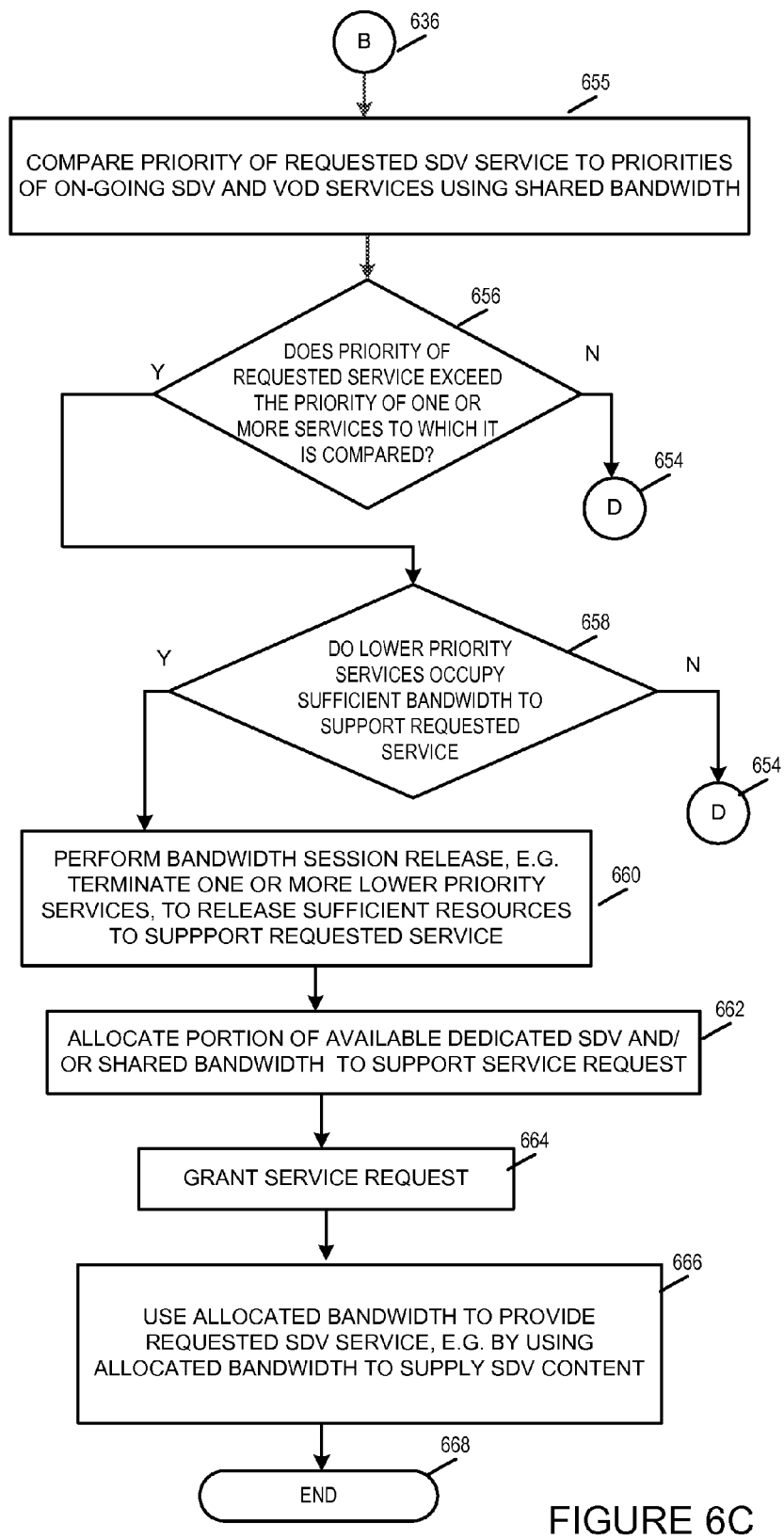
Figure 6D:
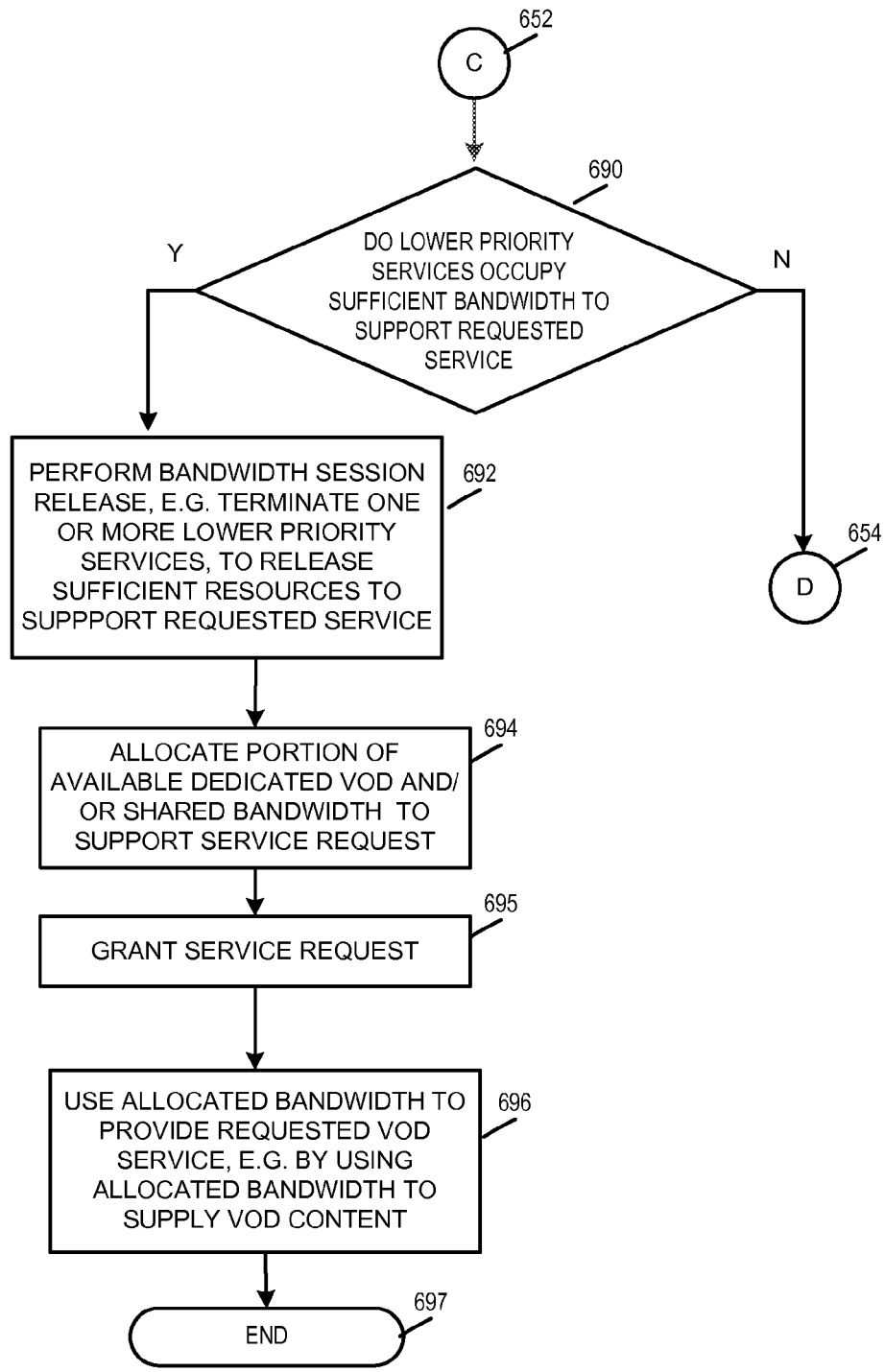
Figure 6E:
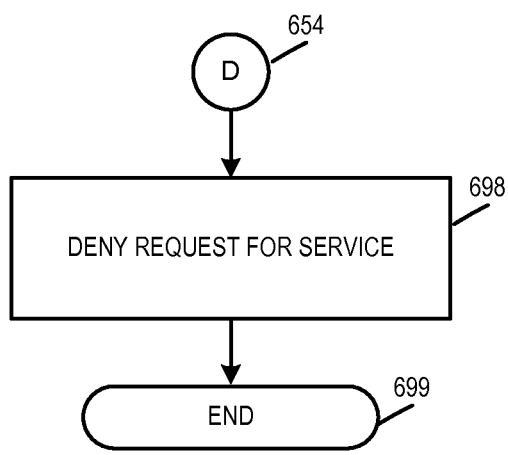

Diagrams 400 and 500 of FIGS. 4 and 5 respectively illustrate exemplary bandwidth allocation and usage in accordance with the present invention.

Diagram 400 of FIG. 4 is now explained in greater detail. Legend 402 shows active switched digital video frequency band 404, in-active switched digital video frequency band 406, and video on-demand frequency band 408. Diagram 400 of FIG. 4 depicts bandwidth shown along a horizontal frequency spectrum. In the example shown, the total bandwidth 410 is partitioned into 37 frequency bands that are associated with modulators for use in transmitting video on-demand and switched digital video services to CPE devices in a service group. The bandwidth is apportioned into dedicated switched digital video bandwidth 418, dedicated video on-demand bandwidth 434 and shared switched digital video and video on-demand bandwidth 424. The switched digital video dedicated bandwidth 418 includes 7 frequency bands, e.g., frequency band 420, for use in providing switched digital video services to the CPE devices of the service group. The video on-demand dedicated bandwidth 434 includes 8 frequency bands, e.g., frequency band 430, for use in providing video on-demand services to the CPE devices of the service group. And, shared switched digital video/video on-demand bandwidth 424 includes 22 frequency bands, e.g., frequency bands 422, 426, and 428, for use in providing video on-demand or switched digital video services. In some embodiments of the present invention, the SDV dedicated bandwidth 418 and VOD dedicated bandwidth 434 is always active and in use.

There are 12 frequency bands of active switched digital video depicted in diagram 400 indicating CPE devices are tuned into those frequency bands and receiving the service content being transmitted on those frequency bands. Five of the 12 active switched digital video frequency bands are part of the shared SD/VOD bandwidth 424 which includes a total of 22 frequency bands. There are 10 in-active switched digital video frequency bands depicted in the In-Active SDV bandwidth 414 being used from the 22 frequency bands allocated to the shared SD/VOD bandwidth 424. The in-active switched digital video frequency bands contain content for a switched digital video service but no CPE devices are currently tuned to those in-active switched digital video service frequency bands. There are 15 frequency bands allocated for providing video on-demand services VOD bandwidth 416. Seven of the frequency bands are part of the 22 frequency bands included in the shared SD/VOD bandwidth 424 and the remaining eight frequency bands are from the VOD dedicated bandwidth 434. There are no in-active video on-demand services.

Diagram 500 of FIG. 5 is now explained in greater detail. Legend 502 shows active switched digital video frequency band 504, in-active switched digital video frequency band 506, and video on-demand frequency band 508, and unused frequency band 509. Diagram 500 of FIG. 5 depicts bandwidth shown along a horizontal frequency spectrum. In the example shown, the total bandwidth 510 is partitioned into 38 frequency bands that are associated with modulators for use in transmitting video on-demand and switched digital video services to CPE devices in a service group. The bandwidth is apportioned into dedicated switched digital video bandwidth 518, dedicated video on-demand bandwidth 534 and shared switched digital video and video on-demand bandwidth 524. The switched digital video dedicated bandwidth 518 includes 7 frequency bands, e.g., frequency band 520, for use in providing switched digital video services to the CPE devices of the service group. The video on-demand dedicated bandwidth 534 includes 8 frequency bands, e.g., frequency band 530, for use in providing video on-demand services to the CPE devices of the service group. And, shared switched digital video/video on-demand bandwidth 524 includes 23 frequency bands, e.g., frequency bands 522, 526, and 528, for use in providing video on-demand or switched digital video services.

There are 12 frequency bands of active switched digital video 512 depicted in diagram 500 indicating CPE devices are tuned into those frequency bands and receiving the service content being transmitted on those frequency bands. Five of the 12 active switched digital video frequency bands are part of the shared SD/VOD bandwidth 524 which includes a total of 23 frequency bands. There are 18 in-active switched digital video frequency bands depicted in the In-Active SDV bandwidth 514 being used from the 23 frequency bands allocated to the shared SD/VOD bandwidth 524. In accordance with one embodiment of the present invention all shared bandwidth is to be in use at all times so as to make the most efficient use of the bandwidth as possible. As a result, any time shared bandwidth is released a new active or in-active switched digital video service will be allocated for use of the bandwidth. This serves among other things, to reduce non-responder impacts in conjunction with the SDV channel map. Furthermore, having an in-active service provided to the service group in bandwidth that otherwise would not be in use is efficient in that if a CPE device requests the service it will already be available to the CPE device without any delay or additional allocation. In this way the system is proactively transmitting or "pushing" services, e.g., video content, out to service groups of CPE devices so that the content will be available to expected viewers. The services which are transmitted may be, and in some embodiments, are determined based on predictive factors such as past viewing habits, service registration, and promotion of the service. There are 4 frequency bands allocated for providing video on-demand services VOD bandwidth 516. These four frequency bands are part of the eight frequency bands of VOD dedicated bandwidth 534. Note that in this exemplary embodiment there are also 4 frequency bands in the VOD dedicated bandwidth spectrum 534 that are unused including frequency band 528. This is so because in this exemplary embodiment there are only 4 on-going video on-demand services being provided and the remaining VOD dedicated bandwidth has not been allocated but is available for use in response to new video on-demand service requests.

In some embodiments of the present invention, when a service becomes in-active because there are no viewers currently registered as using the service, i.e., no viewership, the system performs a bandwidth session release regardless of whether the bandwidth is SDV only, VOD only or shared bandwidth. The bandwidth session release process results in the bandwidth allocated to the in-active service being recovered so that the system can quickly allocate the bandwidth to newly requested services. This operation is sometimes referred to as min mode and typically results in better packing efficiency. That is the ability to group contiguous bandwidth spectrum together. Various services require more contiguous bandwidth than others such as HDTV versus SDTV services. This efficiency however comes at the expense of loss of viewing to CPE devices that have gone non-responding.

Figure 7:
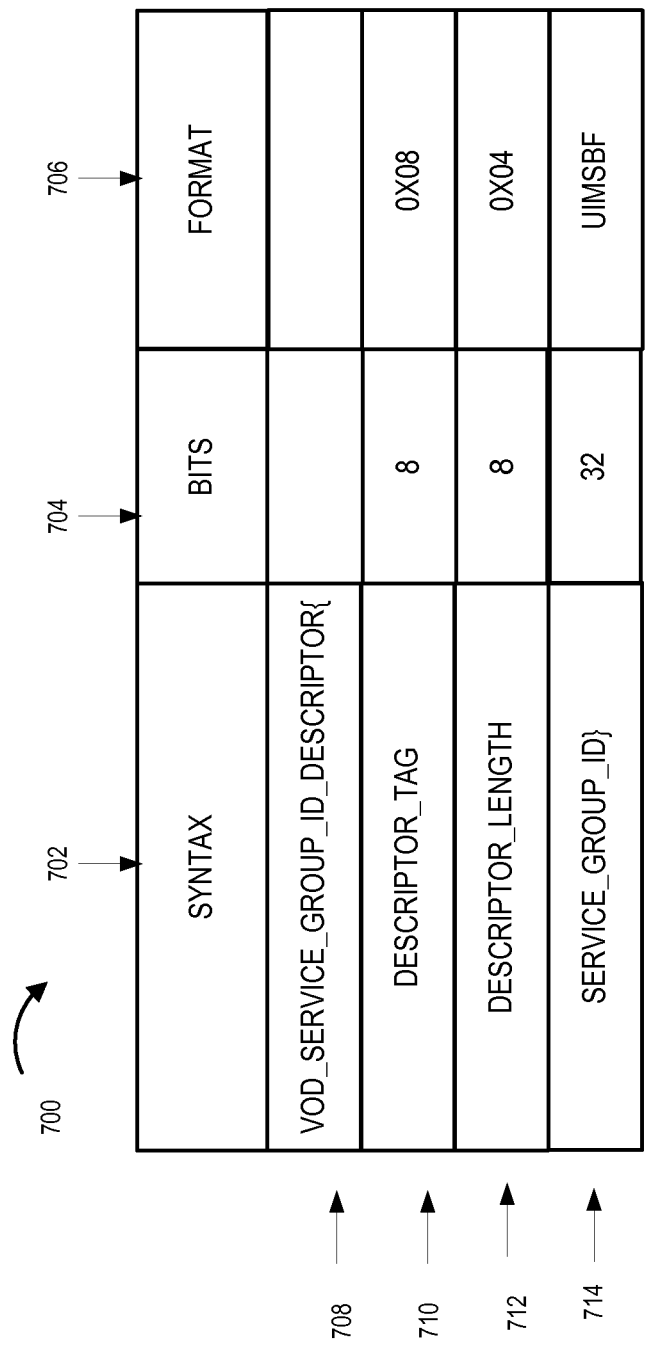
FIG. 7 illustrates an exemplary VOD_SERVICE_GROUP_ID_DESCRIPTOR in accordance with one embodiment of the invention.

Table 700 of FIG. 7 provides an exemplary VOD_SERVICE_GROUP_ID_DESCRIPTOR in accordance with an exemplary embodiment of the invention. Column 702 provides the syntax, column 704 identifies the number of bits and column 706 identifies the format. Row 708 identifies the VOD_SERVICE_GROUP_ID_DESCRIPTOR. Row 710 provides information corresponding to the VOD_SERVICE_GROUP_ID_DESCRIPTOR's Descriptor Tag field. The DESCRIPTOR_TAG is an 8 bit unsigned integer that has the value 0x08, identifying this descriptor as a VOD_SERVICE_GROUP_ID_DESCRIPTOR. Row 712 provides information corresponding to VOD_SERVICE_GROUP_ID_DESCRIPTOR's Descriptor Length field. The DESCRIPTOR_LENGTH is an 8-bit unsigned integer that has the value 0x04 that specifies the length in bytes immediately following this field up to the end of the descriptor. Row 714 provides information corresponding to the VOD_SERVICE_GROUP_ID_DESCRIPTOR's Service Group ID field. The SERVICE_GROUP_ID is a 32-bit unsigned integer that specifies the service group identifier (SG_ID) used to communicate the narrowcast spectrum of the client with the video on-demand session setup protocol (SSP) session resource manager (SRM). This ID may be the same or different from the switched digital video service group ID descriptor. In some embodiments of the present invention, for those sites having modulators capable of sharing bandwidth the video on-demand and switched digital video group identifiers are the same.

Figure 8:
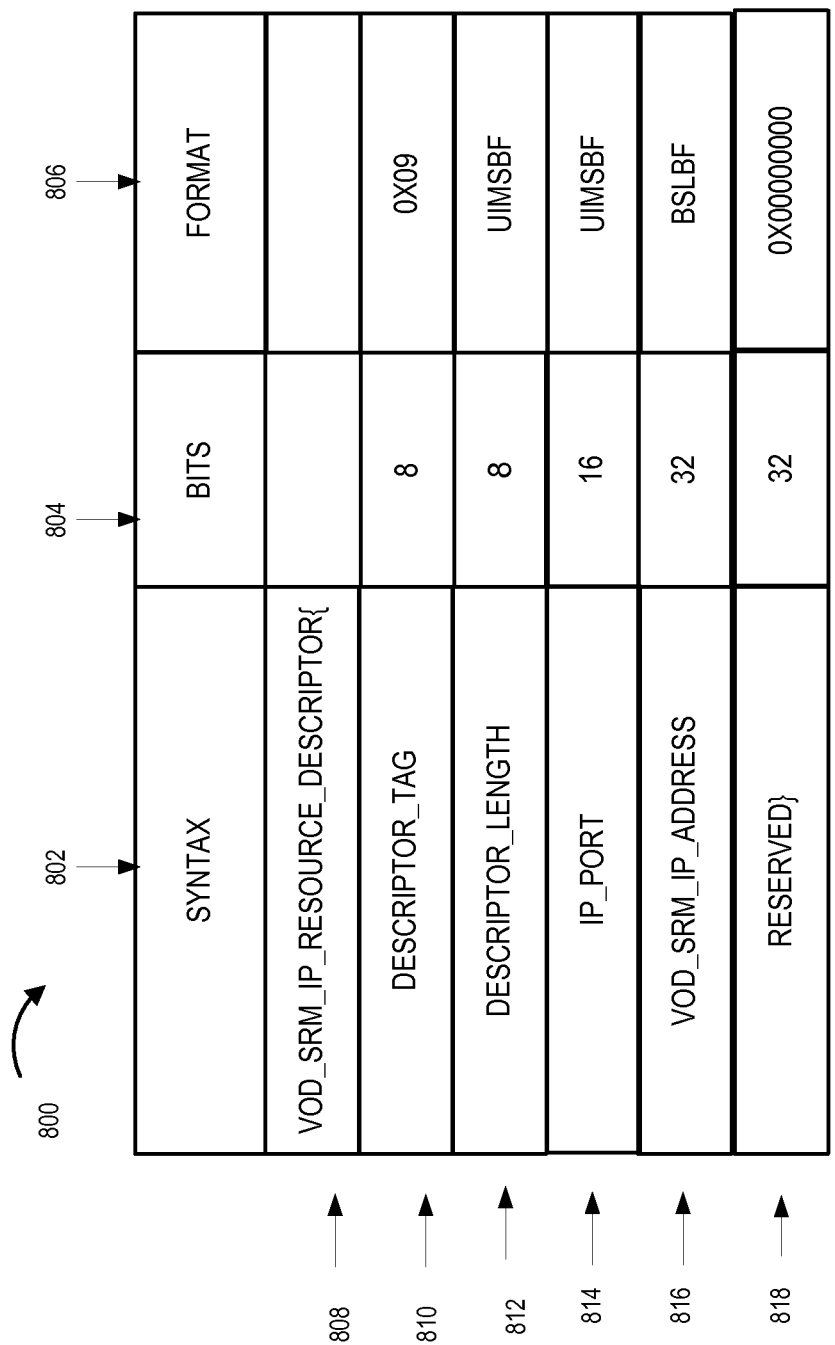
FIG. 8 illustrates an exemplary VOD_SRM_IP_RESOURCE_DESCRIPTOR in accordance with one embodiment of the invention.

Table 800 of FIG. 8 provides an exemplary VOD_SRM_IP_RESOURCE_DESCRIPTOR in accordance with an exemplary embodiment of the invention. Column 802 provides the syntax, column 804 identifies the number of bits and column 806 identifies the format. Row 808 identifies the VOD_SRM_IP_RESOURCE_DESCRIPTOR. Row 810 provides information corresponding to the VOD_SRM_IP_RESOURCE_DESCRIPTOR's Descriptor Tag field. The DESCRIPTOR_TAG is an 8 bit unsigned integer that has the value 0x09, identifying this descriptor as a VOD_SRM_IP_RESOURCE_DESCRIPTOR. Row 812 provides information corresponding to the VOD_SERVICE_GROUP_ID_DESCRIPTOR's Descriptor Length field. The DESCRIPTOR_LENGTH is an 8-bit unsigned integer that specifies the length in bytes immediately following this field up to the end of the descriptor. Row 814 provides information corresponding to the VOD_SERVICE_GROUP_ID_DESCRIPTOR's IP_Port field. The IP_Port field is used to indicate the listening port of the video on-demand session resource manager that the client, i.e. CPE device, shall connect to. Row 816 provides information corresponding to VOD_SRM_IP_Address VOD_SRM_IP_Address field. The VOD_SRM_IP_Address field is used to indicate the IP address of the VOD session resource manager that the client, i.e. CPE device, shall connect to. Row 818 provides information corresponding to the VOD_SERVICE_GROUP_ID_DESCRIPTOR's RESERVED field. The RESERVED field is a field that is not currently used but is reserved for potential use in the future.

The following describes how the enablement mechanism or process for those universal session resource manager (USRM) hub sites where bandwidth sharing is enabled. First the switched digital video server, e.g., SDV Server 268 populates the fields of the VOD_SERVICE_GROUP_ID_DESCRIPTOR and VOD_SERVICE_GROUP_ID_DESCRIPTOR. It points to the USRM in the IP_PORT and VOD_SRM_IP_ADDRESS fields and uses the same SG_ID as switched digital video when populating the Service_Group_ID field. Second, the client code provided to the CPE devices is updated so the CPE devices stop using the service group map file and instead uses the data in the descriptors. The CPE devices will get the descriptors on boot, so this step of the process is directed to having the client in the CPE devices no longer execute code to discover CPE devices service group through use of the service group map file. The elimination of executing this map file service group discovery code should make the CPE devices more efficient and speed up service requests and tuning Third, as the CPE device clients start using the direct address to the USRM, the VSM is still able to distribute VOD_SRM session requests to the owning USRM, so there is no impact on the viewer as the change is implemented across the system. Four, after the period of time the system operators identify any CPE devices making requests on the VSM as not getting the code upgrade and provide it the code upgrade. Five, eventually the VSM is no longer needed and the video on-demand is distributed to the appropriate USRM that has already been doing all the work setting up sessions on the encryptors and QAM modulators.

The enablement mechanism or process for sites where bandwidth sharing is not enabled includes the following steps. First, the system provides the VOD descriptor to the service group ID that matches the switched digital video service group. This requires that the VSM track the resource to switched digital video service group level. Second, the system uses a configured IP address to instruct the CPE devices client software to use the VSM for the SRM for VOD sessions. Third, sessions flow to the VSM in the same manner as when the CPE devices used the file-based VOD service group discovery mechanism. Mechanisms should also be implemented providing updates to the CPE devices when their video on-demand service group ID changes for example when the service group is split into two or when the IP address changes because the service group was moved to a new VSM or USRM.

The use of this software messaging scheme forces the alignment of the switched digital video and video on-demand service groups, locks in the bandwidth sharing benefits, and requires a common narrowcast. While it may seem that a system operator loses capability and flexibility with this alignment of the video on-demand and switched digital video service groups and sharing of bandwidth, the simplicity of operations and system design act to unify the narrowcast capacity across the operators various systems.

Having separate SDV and VOD descriptors and service group IDs provides system operators the flexibility to provide SDV and VOD services using separate SDV and VOD session and resource managers. By aligning the SDV and VOD service groups and associated IDs it also allows for bandwidth sharing to occur between separate session and resource managers. Policies, priorities, and rules governing when one session and resource manager may utilize bandwidth that is being managed by a different session and resource manager, may be and in some embodiments is, generated by SRM module 222 located in the headend 102 and distributed to the separate session and resource managers managing local QAM modulators supporting separate service groups. For example, in the case when a first session and resource manager does not have sufficient bandwidth to support newly received service requests, that resource manager may request bandwidth assigned to a second session and resource manager supporting a separate service group prior to issuing a denial of service. In this example, whether the bandwidth assigned to the second session and resource manager will be made available to the first session and resource manager will depend on the whether the priority of the new service request is greater than the priority of the services currently operating in both the first and second service groups.

In some embodiments of the present invention, parent and child service groups are implemented wherein one service group, the parent service group, completely encompasses all of the CPE devices of two or more service groups referred to as child service groups. This allows the child plus the parent to service the child's CPE devices, but each child can only service their own CPE devices. This concept can be extended for any number of levels of parent and child service groups. The following is an example of using parent and children service groups. In this example, a parent service group contains CPE devices 1 thru 30, the first child service group contains CPE devices 1 thru 10, the second child service group contains CPE devices 11 thru 20 and the third child service group contains CPE devices 21 thru 30. If service A is provided to the parent service group then all CPE devices 1 thru 30 can access service A. That is each of the CPE devices that are part of the first, second and third child service groups can access the service A. However, if service B is only provided to the first child service group then only the CPE devices in the first service group can access service B that is CPE devices 11 thru 20. The CPE devices in the second and third service groups cannot access service B. In an exemplary bandwidth sharing policy which utilizes parent and children service groups, switched digital video services are provided to a parent service group so that those services can be accessed by any of the CPE devices in any of its children's service groups while VOD services which are always unicast are prioritized such that they are provided using a child service group bandwidth over using the shared parent service group bandwidth. As previously discussed in a typical large system, there are roughly 40 switched digital video servers providing switched digital video to populations ranging from 20K to 25K CPE devices per server. These servers respond to requests for millions of tunes daily and can, and do, handle the few additional tens of thousands of session setup protocol sessions for those subset of CPE devices. Providing a discrete number of CPE devices talking to one SRM makes a large and small system look the same. It reduces the need for any one SRM to continue to grow in size until it breaks.

Additionally, CPE devices within the system which are not using the QPSK OOB network to sign on to the network will not have to re-invent the way they receive the SRM_IP_Address. Any CPE devices operating with session setup protocol are in lock step with switched digital video and reading the descriptors is already being performed.

FIG. 6, which comprises the combination of FIGS. 6A, 6B, 6C, 6D and 6E shows the steps of a method 600 for providing narrowcast bandwidth resource allocation in accordance with one exemplary embodiment of the invention. The method 600 allows a system to efficiently utilize shared and dedicated narrowcast bandwidth to provide video on-demand and switched digital video services to a set of customer premise equipment devices, e.g., set top boxes assigned to a service group.

The method 600 includes steps performed by various elements of the exemplary system, shown in FIGS. 1-3.

The method 600 starts in step 602, e.g., with the various components in the system being initialized. Processing proceeds to store configuration information step 604 which includes processing sub-steps 606, 608, 610 and 612.

In one embodiment, the sub-steps shown in processing step 604 are performed by the Switched Digital Video/Video On-Demand Video Control module 104 in headend 102 in association with other components of the system located in the hub sites e.g., hub site 1 110 of system 100. In some embodiments, Switched Digital Video Manager module 224 and the Video On-Demand Manager module 222 of FIG. 2 perform the processing step 604 in association with the Switched Digital Video—Resource Manager module 270 and/or Video On-Demand—Resource Manager 273. In some embodiments, the Switched Digital Video—Resource Manager module and/or the Video On-Demand Resource Manager 273 are located in the headend 102 inside of the hub site 1 110.

In processing sub-step 606 a portion of the total bandwidth available to provide services to the service group is configured to be dedicated bandwidth for switched digital video services. In processing sub-step 608 a portion of the total bandwidth available to provide services to the service group is configured to be dedicated bandwidth for providing video on-demand services. In sub-step 610 a portion of the total bandwidth available to provide services to the service group is configured to be shared bandwidth for providing switched digital video and video on-demand services. This apportionment of total bandwidth can be understood from exemplary bandwidth allocation FIG. 4. Diagram 400 of FIG. 4 depicts bandwidth shown along a horizontal frequency spectrum. In the example shown, the total bandwidth 410 is partitioned into 37 frequency bands that are associated with modulators for use in transmitting video on-demand and switched digital video services to CPE devices in a service group. The bandwidth is apportioned into dedicated switched digital video bandwidth 418, dedicated video on-demand bandwidth 434 and shared switched digital video and video on-demand bandwidth 424. The switched digital video dedicated bandwidth 418 includes 7 frequency bands, e.g., frequency band 420, for use in providing switched digital video services to the CPE devices of the service group. The video on-demand dedicated bandwidth 434 includes 8 frequency bands, e.g., frequency band 430, for use in providing video on-demand services to the CPE devices of the service group. And, shared switched digital video/video on-demand bandwidth 424 includes 22 frequency bands, e.g., frequency bands 422, 426, and 428, for use in providing video on-demand or switched digital video services.

In processing sub-step 612, the QAM modulators, e.g., 3rd party QAM modulators 278 and QAM modulators 276, are assigned to a portion of the frequency of the total bandwidth corresponding to the switched digital video dedicated bandwidth (e.g., bandwidth 418 of FIG. 4 or 518 of FIG. 5), video on-demand dedicated bandwidth (e.g., bandwidth 434 of FIG. 4 or 534 of FIG. 5), or shared switched digital video/video on-demand bandwidth (e.g., bandwidth 424 of FIG. 4 or 524 of FIG. 5). These assignments may be, and in some embodiments of the present invention are, made based at least in part on whether the modulators being assigned are capable of sharing bandwidth or have been statistically or logically partitioned not to share bandwidth. Those modulators which are not capable or have been partitioned not to share bandwidth are assigned to frequency bands dedicated for switched digital video or dedicated video on-demand bandwidth use. For example, if one of the QAM modulators from QAM modulators 276 is unable to share bandwidth it may be, and in some embodiments is, assigned to use the frequency band 420 which is part of the switched digital video dedicated bandwidth 418 of FIG. 4. Another QAM modulator which is unable to share bandwidth from the QAM modulators 276 may be, and in some embodiments of the present invention is, assigned to use the frequency band 430 which is part of dedicated video on-demand bandwidth 434 of FIG. 4. An additional QAM modulator from the QAM modulators 276 which is able to share bandwidth may be, and in some embodiments is, assigned to use the frequency band 426 which is part of the shared SD/VOD bandwidth 424.

The Switched Digital Video Manager module 224 and Video On-Demand Manager module 222 assign the CPE devices to the switched digital video and video on-demand service groups respectively. The Switched Digital Video Manager module 224 and Video On-Demand Manager module 222 align the service groups and service group IDs so that the same CPE devices are in the same service groups and are supported by a single resource manager, e.g., the Switched Digital Video—Resource Manager 270. The QAM modulators are then matched to the service group they will be supporting.

The system configuration information of the present invention is stored in memory e.g., memory storage 140. The system configuration information that is stored includes a mapping of the following information: the bandwidth frequency bands apportioned to be dedicated for switched digital video services; the bandwidth frequency bands apportioned to be dedicated for video on-demand services; the bandwidth frequency bands apportioned to be shared bandwidth for use by switched digital video or video on-demand services; information identifying which CPE devices are assigned to each service group; the resource manager assigned to each service group, the QAM modulators frequency band assignments; information associating the QAM modulators, frequency bands, and service groups; and information regarding the CPE device identification and type information (e.g., one way or two way device, single or multiple tuner). In some embodiments, some but not all of the above information is stored in memory.

In some embodiments the system configuration information is stored in memory associated with or contained in the SDV Manager 224, the VOD Manager module 222, the Session Resource Manager module 220 and/or the Bandwidth Sharing Mechanism module 226 for later use by one or more components of the system for instance to re-configure the system after startup or to determine information to be used in generating and/or enforcing bandwidth sharing rules, policies and/or priorities.

Upon completion of initialization of various system components and the storage of system configuration information in the sub-steps of processing step 604, processing proceeds to processing steps 614 and 616. At processing step 614, the Switched Digital Video Manager module 224 transmits the CPE device to service group mapping information to each of the CPE devices in each of the service groups and the address of the switched digital video server (e.g., SDV server 268) supporting the service group. For example, the address of the SDV server 268 and the SDV service group ID 1 may be, and in some embodiments is, sent to CPE devices 116, 118 thru 120 which are coupled to hub site 1 110 and form service group ID 1. The VOD server address is also transmitted from the VOD Manager module 222 to each of the CPE devices, e.g., set top boxes, in the service group, e.g., CPE devices 116, 118 thru 120 for service group ID 1. At processing step 616 monitoring for service requests at the SDV server 268 in the hub site (e.g., hub site 1 110) commences. Service requests may be initiated from CPE devices, e.g., set top boxes, operators, or the service itself. An exemplary CPE device service request is a change channel request, which is transmitted from a CPE device over the HFC network to the switched digital video server 268 at hub site 1 110. When a CPE device service request is detected in monitoring step 616 operation then proceeds to step 618 where the service request is received. In the exemplary embodiment, the SDV server receives the CPE device service request, e.g., channel change request corresponding to a request for a program. The switched digital video server determines based on the switched digital video service group the requesting CPE device is assigned to whether or not the requested program service is already being delivered to the switched digital video service group to which the CPE device is assigned. If the program is already being provided to the service group, the switched digital video server 168 sends the tuning information for the program to the CPE device either by sending a message to the CPE device and/or via a mini-carousel. In those instances in which the switched digital video server 268 determines that the requested service, e.g., program, is not currently being provided to the requesting CPE device's service group then processing operations proceed to processing step 620. In some embodiments, it is desirable at certain times to have a specific QAM channel (bandwidth frequency) be vacated of a currently streaming program requiring that the active viewing of the stream cease. It is also desirable to have this occur in a manner that does not require force-tuning of the CPE device. This functionality may, and in some embodiments, is achieved by having the switched digital video server 168 direct the CPE devices tuned to the specific QAM channel to be vacated to an a different QAM channel on which the identical service stream is set up for this purpose. This allows for a more graceful, less disruptive vacating of the first QAM channel to occur. This functionality is sometimes referred to as program select request priority tuning. When program select request priority tuning is performed, the mini-carousel tuning information is not used. This functionality is useful for planning the "packing" of QAM channels for efficient carriage of HD service streams. That is to obtain as large a quantity of contiguous bandwidth as possible to support HDTV format service streams which require more contiguous bandwidth than SDTV format service streams.

At processing step 620 the system determines the priority of the requested service in sub-steps 622 and 624 and the priority of the on-going switched digital video and video on-demand services in processing steps 626 and 628 respectively. On-going services are those services being delivered on the narrowcast bandwidth. On-going services are also referred to as services that are in operation. It will be appreciated that a service that is in operation that is an on-going switched digital video or video on-demand service will be utilizing narrowcast bandwidth. In some embodiments, processing step 620 is bypassed such as when the system has sufficient unused bandwidth to support the newly requested service. In some embodiments, the type of service request is determined prior to the determination of service priorities. In some embodiments, when the newly received request is a video on-demand request processing sub-step 626 is bypassed when there is sufficient dedicated video on-demand bandwidth available with a lower priority than newly received request for video on-demand service. In some embodiments, when the newly received request is a request for switched digital video service processing of sub-step 628 is bypassed when there is sufficient dedicated switched digital video bandwidth available with a lower priority than the newly received request for switched digital video service. In some embodiments, the processing sub-steps 626 and 628 are not performed but instead previously determined priorities for on-going switched digital video and video on-demand services are utilized. In some embodiments, the service priorities 622, 626, and/or 628 are determined as a function of the priority values assigned to a subset of each service's and/or request's attributes or features. In some embodiments, the priority values assigned to a service attribute or feature is determined by a policy server. In some embodiments, the Bandwidth Sharing Mechanism module 226 is a policy server that creates the service priority values associated with the service attributes and features and communicates those values to modules responsible for managing bandwidth usage.

In the exemplary embodiment of the present invention, the Switched Digital Video-Resource Manager module 270 in hub site 1 110 determines the service priorities of the requested service, the on-going switched digital video services and the on-going video on-demand services. Service priorities may be, and in some embodiments is stored in tables such as for example tables 1000, 1100, 1200, 1300, 1400, and 1500 of FIGS. 10, 11, 12, 13, 14, and 15. In some embodiments of the present invention, the Session Resource Manager module 220 in the head end 102 determines the priorities of the requested service, the on-going switched digital video services and the on-going video on-demand services. In some embodiments, the service priority for one or more of the on-going switched digital video services, the on-going video on-demand services, and/or the request for service are determined by the Switched Digital Video Resource Manager module 270 while the remaining services priorities are determined by the Session Resource Manager module 220. In step 624, the cumulative service priorities for the new service request as well as the on-going services is calculated by summing the individual service attribute priority values corresponding to the received request and for each of on-going services separately.

Operation proceeds from step 620, via connection node A 630, to step 632. At step 632, the service priorities determined in step 620 are stored for future use in memory in the headend, hub site or both. In some embodiments, the Switched Digital Video Manager module 270 and/or the Session Resource Manager module 220 contain memory or have memory associated therewith that they can access. In such embodiments, the determined service priorities can be stored in memory of the Switched Digital Video Manager module 270 and/or Session Resource Manager module 220 or memory associated with these modules. Operation then proceeds from step 632 to decision step 634.

At decision step 634, the system determines if the received service request type is a request for video on-demand or a request for switched digital video. If the received service request is a request for video on-demand service then processing proceeds to decision step 638. If the received request is a request for switched digital video service then processing proceeds to step 655 via connection node B 636. The Switched Digital Video—Resource Manager module 270 in the hub site 1 110 performs decision step 634. In some embodiments, the Session Resource Manager module 220 in the head end performs decision step 634. In some embodiments the Switched Digital Video—Resource Manager module 270 is located in the headend 102 as opposed to the hub site 1 110.

At step 638, the system determines if there is sufficient unused dedicated video on-demand bandwidth available to support the video on-demand service request received in step 618. If there is sufficient dedicated video on-demand bandwidth available then processing proceeds to step 640. If there is insufficient dedicated video on-demand bandwidth available then processing proceeds to step 648. In the exemplary embodiment of the invention, the operation of step 638 is performed in the hub site 1 110 by the Switched Digital Video—Resource Manager module 270. In some embodiments, step 638 is performed in the head end by Session Resource Manager module 220. As previously discussed, in some embodiments the Switched Digital Video—Resource Manager module 270 is located in the headend 102 as opposed to the hub site 1 110.

At step 640, the system allocates a portion of available dedicated video on-demand bandwidth to support the service request. In the exemplary embodiment of the invention, the Switched Digital Video—Resource Manager module 270 performs the allocation step 640. Step 640 may be, and in some embodiments of the present invention is, performed by the Session Resource Manager module 220. After bandwidth has been allocated in step 640, the system grants the service request in step 642 and then uses the allocated bandwidth to provide the requested video on-demand service in step 644, for example by providing the video on-demand content requested on the allocated bandwidth to the CPE device which made the request. In some embodiments, the Session Resource Manager module 220 performs the bandwidth allocation and communicates the allocation commands to the Switched Digital Video—Resource Manager 270 in the hub site. The Switched Digital Video—Resource Manager 270 then assigns various QAM modulator hardware and/or software to allocate the narrowcast bandwidth necessary to support the requested service from the QAM modulators, e.g., 3rd Party QAM modulators 278, and binds the bandwidth to a session to support the requested video on-demand service. In another embodiment, the Session Resource Manager module 220, communicates directly with the QAM modulators, e.g., 3rd Party QAM modulators 278, and performs the assignments, bandwidth allocation and session setup itself. In other embodiments, the Switched Digital Video—Resource Manager 270 performs the bandwidth allocation process without input from the Session Resource Manager module 220. After bandwidth has been allocated and the service request granted in steps 640 and 642, the Switched Digital Video Server transmits to the requesting CPE device either directly and/or through a mini-carousel the bandwidth frequency the requested service will be provided on and utilizes the allocated bandwidth to provide the video on-demand content requested by the CPE device. Processing then proceeds to end step 646 where this portion of the processing associated with the request for service concludes but overall system operation continues. For example, throughout the aforementioned steps the system has been and continues monitoring for service requests in step 616 and processing any service requests detected.

As discussed above, when it is determined in decision step 638 that there is insufficient unused dedicated video on-demand bandwidth available to support the requested video on-demand service request processing proceeds to step 648. At step 648, the system compares the priority of the requested video on-demand service to the priorities of the on-going switched digital video services using shared bandwidth and the priorities of on-going video on-demand services. In some embodiments, the Session Resource Manager module 220 performs this operation using the service priorities determined in step 620 and which are stored in memory in step 632. In step 650, the system makes a decision as to whether the priority of the requested service exceeds the priority of one or more services to which it was compared in step 648. If the requested service's priority does exceed the priority of one or more of the services to which it is compared then processing proceeds to decision step 690 via connection node C 652. If the requested service's priority does not exceed the priority of one or more services to which it was compared in step 648 then processing proceeds to step 698 via connecting node D 654.

In decision step 690, the system determines if the on-going services with a lower priority than the requested video on-demand service occupy sufficient bandwidth to support the requested video on-demand service. If the lower priority on-going services do not occupy sufficient bandwidth to support the requested service processing proceeds to step 698 via connection node D 654. If the lower priority on-going services do occupy sufficient bandwidth to support the requested service then processing proceeds to step 692. In an exemplary embodiment of the present invention, processing operation step 692 is performed in the Switched Digital Video—Resource Manager module 270. In some embodiments of the present invention, decision step 690 is performed in the Session Resource Manager module 220.

In processing step 692, the system performs a bandwidth session release, for example it terminates one or more on-going services, to release sufficient resources that is narrowcast bandwidth to support the requested service. In an exemplary embodiment this operation is performed by the Switched Digital Video—Resource Manager 270. In some embodiments, this operation is performed by the Session Resource Manager module 220. The determination of which lower priority service or services to terminate may be, and in some embodiments is, made by identifying and terminating those services with the lowest priority until sufficient bandwidth is available to support the requested service.

From step 692 processing proceeds to step 694. At step 694, the system allocates a portion of available dedicated video on-demand and/or shared bandwidth to support the service request. In some embodiments, a portion of the available bandwidth may be, and in some instances is, all of the available bandwidth. The allocation process of step 694 may be, and in some embodiments is, performed by the Session Resource Manager module 220 and/or the Switched Digital Video—Resource Manager module 270.

After bandwidth has been allocated in step 694, the system grants the service request in step 695 and then uses the allocated bandwidth to provide the requested video on-demand service in step 696, for example by providing the video on-demand content requested on the allocated bandwidth to the CPE device which made the request. In the exemplary embodiment, the Switched Digital Video—Resource Manager module 270 performs the bandwidth allocation process. In some embodiments, the Session Resource Manager module 220 performs the bandwidth allocation and communicates the allocation commands to the Switched Digital Video—Resource Manager module 270 which may be located in either the hub site or headend. The Switched Digital Video—Resource Manager module 270 then assigns various QAM modulator hardware and/or software to the allocated narrowcast bandwidth necessary to support the requested service from the QAM modulators, e.g., 3rd Party QAM modulators 278, and binds the bandwidth to a session to support the requested video on-demand service. In another embodiment, the Session Resource Manager module 220, communicates directly with the QAM modulators, e.g., 3rd Party QAM modulators 278, and performs the assignments, bandwidth allocation and session setup itself. After bandwidth has been allocated and the service request granted in steps 694 and 695, the Switched Digital Video Server transmits to the requesting CPE device either directly and/or through a mini-carousel the bandwidth frequency the requested service will be provided on. The allocated bandwidth is then utilized to provide the video on-demand content requested by the CPE device. The video on-demand content is provided in the exemplary embodiment from the video on-demand server 272 located in the hub site 1 110. In some embodiments, the video on-demand server 272 is located in headend 102. In some embodiments, the video on-demand server is coupled to the system but not located within the system. Processing then proceeds to end step 697 where this portion of the processing associated with the request for service concludes but overall system operation continues. For example, throughout the aforementioned steps the system has been and continues monitoring for service requests in step 616 and processing any service requests detected.

As discussed above, if the request received in step 616 is determined to be a switched digital video service request in decision step 634 then processing proceeds at step 655. In step 655, the system compares the priority of the requested switched digital video service to the priorities of the on-going switched digital video services and the video on-demand services using shared bandwidth. In an exemplary embodiment, the comparison step 655 is performed by Switched Digital—Resource Manager module 270 in the hub site. In some embodiments, this step may be, and is performed by the Session Resource Manager module 220 in the headend 102 or by the combination of the Session Resource Manager module 220 and the Switched Digital Video—Resource Manager module 270. Processing then proceeds to decision step 656. At processing step 656, the system determines if the priority of the requested service exceeds the priority of one or more services to which it was compared in step 655. If the service request has a lower priority than the services to which it was compared then processing proceeds to step 698 via connection node D 654.

In decision step 658, the system determines if the on-going services with a lower priority than the requested switched digital video service occupy sufficient bandwidth to support the requested switched digital video service. If the lower priority on-going services do not occupy sufficient bandwidth to support the requested service processing proceeds to step 698 via connection node D 654. If the lower priority on-going services do occupy sufficient bandwidth to support the requested service then processing proceeds to step 660. Processing operation steps 656 and 658 are performed in an exemplary embodiment by the Switched Digital Video—Resource Manager module 270. In some embodiments of the present invention, decision steps 656 and 658 are performed by Session Resource Manager module 220.

In processing step 660, the system performs a bandwidth session release, for example it terminates one or more on-going services, to release sufficient resources that is narrowcast bandwidth to support the requested service. This operation is performed by the Switched Digital Video—Resource Manager module 270 in an exemplary embodiment. In some embodiments, the Session Resource Manager module 220 or the Sessions Resource Manager module 220 and the Switched Digital Video—Resource Manager module 270 perform this operation. The determination of which lower priority service or services to terminate in at least some embodiments is made by identifying and terminating those services with the lowest priority until sufficient bandwidth is available to support the requested service.

From step 660 processing proceeds to step 662. At step 662, the system allocates a portion of available dedicated switched digital video and/or shared bandwidth to support the service request. In some embodiments, a portion of the available bandwidth may be, and in some instances is, all of the available bandwidth. In some embodiments, the allocation process of step 662 is performed by the Session Resource Manager module 220 and/or the Switched Digital Video—Resource Manager 270.

After bandwidth has been allocated in step 662, the system grants the service request in step 664 and then uses the allocated bandwidth to provide the requested switched digital video service in step 666, for example by providing the switched digital video content requested on the allocated bandwidth to the CPE device which made the request. In an exemplary embodiment, the Switched Digital Video—Resource Manager module 270 performs the bandwidth allocation process. In some embodiments, the Session Resource Manager module 220 performs the bandwidth allocation and communicates the allocation commands to the Switched Digital Video—Resource Manager 270 in the hub site. The Switched Digital Video—Resource Manager then assigns various QAM modulator hardware and/or software to the allocated narrowcast bandwidth necessary to support the requested service from the QAM modulators, e.g., 3rd Party QAM modulators 278 and/or QAM modulators 276, and binds the bandwidth to a session to support the requested switched digital video service. In another embodiment, the Session Resource Manager module 220, communicates directly with the QAM modulators, e.g., 3rd Party QAM modulators 278 or QAM Modulators 276, and performs the assignments, bandwidth allocation and session setup itself. After bandwidth has been allocated and the service request granted in steps 662 and 664, the Switched Digital Video Server transmits to the requesting CPE device either directly and/or through a mini-carousel the bandwidth frequency the requested service will be provided on. The SDV server 268 then utilizes the allocated bandwidth to provide the switched digital video content requested by the CPE device. The switched digital video content may be, and in some embodiments is, received by the headend 102 prepared for transmission in staging processor 250 of the SDV Media Path module 106, encrypted by bulk encryptor 254 and then selected for transmission and routed to the hub site 1 110 by switch/router 256 via link 264 to edge switch/router 274 where the content is switched to the modulator, e.g., one of the 3rd Party QAM modulators 278, assigned to transmit the switched digital video content on the allocated bandwidth. The QAM modulator then sends the switched digital video content over link 294 to the combiner 282 which sends the content over the HFC network 212 to the CPE devices in the service group which included the CPE device that requested the service. Processing then proceeds to end step 668 where this portion of the processing associated with the request for service concludes but overall system operation continues. For example, throughout the aforementioned steps the system has been and continues monitoring for service requests in step 616 and processing any service requests detected.

At step 698, the system denies the request for service. Step 698 in an exemplary embodiment is performed by the Switched Digital Video—Resource Manager 270. In some embodiments the Session Resource Manager module 220 or the Session Resource Manager module 220 and the Switched Digital Video—Resource Manager module 270. Processing then proceeds to end step 699 where this portion of the processing associated with the request for service concludes but overall system operation continues. For example, throughout the aforementioned steps the system has been and continues monitoring for service requests in step 616 and processing any service requests detected.

While a logical sequencing of the processing steps of the exemplary embodiments of the methods, routines and subroutines of the present invention have been shown, the sequencing is only exemplary and the ordering of the steps may be varied.

An exemplary method in accordance with the present invention is a method of providing video on-demand and switched digital video using bandwidth to a first set of customer premise equipment devices, the method comprising: using a first dedicated portion of said bandwidth to provide video on-demand services; using a second dedicated portion of said bandwidth to provide switched digital video services; and using a third portion of said bandwidth to provide both video on-demand and switched digital video services, said third portion of said bandwidth being available for communicating either video on-demand or switched digital video, the size of a video on-demand portion of third portion of bandwidth varying as a function of requests for video on-demand content received from one or more customer premise equipment devices and a video on-demand service priority relative to a switched digital video service priority. The method may be, and in some embodiments is, implemented, wherein said video on-demand service priority is a priority for a video on-demand service; and said switched digital video service priority is a priority for a switched digital video service. In some embodiments, the described method further comprises: responding to a request for service based on the type of service requested; wherein responding to the request for service includes allocating bandwidth in the first dedicated portion of said bandwidth if the requested service is a video on-demand service and the first dedicated portion of said bandwidth has sufficient unused bandwidth available to support the requested video on-demand service. In some embodiments, the method includes the prioritization of services and requests for determining the allocation of bandwidth. In such an embodiment, when said request for service is a request for video on-demand service and said first dedicated portion of said bandwidth does not have sufficient unused bandwidth available to support the requested video on-demand service, the method includes determining if the requested video on-demand service has a higher priority than another service currently utilizing either some of said third (shared) portion of bandwidth or some of said first (VOD) portion of bandwidth.

Another exemplary method of providing video on-demand and switched digital video using bandwidth to a first set of customer premise equipment devices in accordance with the present invention, is a method comprising: using a first dedicated portion of said bandwidth to provide video on-demand services; using a second dedicated portion of said bandwidth to provide switched digital video services; and using a third portion of said bandwidth to provide both video on-demand and switched digital video services, said third portion of said bandwidth being available for communicating either video on-demand or switched digital video, the size of a video on-demand portion of third portion of bandwidth varying as a function of requests for video on-demand content received from one or more customer premise equipment devices and a video on-demand service priority relative to a switched digital video service priority; and wherein the system implementing the method responds to a request for service based on the type of service requested. In those instances in which the request for service is a request for a switched digital video service, the system, e.g., switched digital video—resource manager module 270 of the system illustrated in FIG. 2, determines if the requested switched digital video service has a higher priority than another switched digital video service currently utilizing either some of said third (shared) portion of bandwidth or some of said second (SDV) portion of bandwidth. In some embodiments of this exemplary method, the step of determining if the requested switched digital video service has a higher priority is performed without first checking if there is unused bandwidth in either said second or third portions of bandwidth. In some embodiments of the exemplary method, the requested switched digital video service has a priority which is higher than any inactive switched digital video service utilizing a portion of said second or third bandwidth.

In some variants of the exemplary method described above, the method utilizes portions of said second and third portions of bandwidth which are not being utilized by an active switched digital video service or a video on-demand service to communicate data corresponding to one or more inactive switched digital video services. In some embodiments of this exemplary method of providing video on-demand and switched digital video more than 90% of the second and third portions of bandwidth are utilized on a continuous basis. In some instances of the exemplary method, said second and third portions of bandwidth are kept fully occupied. In some embodiments of this exemplary method, this is achieved by having a policy server, e.g., bandwidth sharing mechanism module 226 of headend 102 generate and distribute to resource managers, e.g., switched digital video—resource manager module 270, policies, priorities and/or rules to manage the available bandwidth the implementation of which will achieve the aforementioned bandwidth usage.

In some embodiments in accordance with the present invention, an inactive switched digital video service which utilizes some of said second and third portions of bandwidth is a service without currently active viewers. In some embodiments, it is a service without currently registered users.

Another exemplary method of providing video on-demand and switched digital video using bandwidth to a first set of customer premise equipment devices in accordance with the present invention, is a method comprising: using a first dedicated portion of said bandwidth to provide video on-demand services; using a second dedicated portion of said bandwidth to provide switched digital video services; and using a third portion of said bandwidth to provide both video on-demand and switched digital video services, said third portion of said bandwidth being available for communicating either video on-demand or switched digital video, the size of a video on-demand portion of third portion of bandwidth varying as a function of requests for video on-demand content received from one or more customer premise equipment devices and a video on-demand service priority relative to a switched digital video service priority; and wherein the system implementing the method responds to a request for service based on the type of service requested. In those instances in which the request for service is a request for a switched digital video service, the system, e.g., switched digital video—resource manager module 270 of the system illustrated in FIG. 2, determines if the requested switched digital video service has a higher priority than another switched digital video service currently utilizing either some of said third (shared) portion of bandwidth or some of said second (SDV) portion of bandwidth and in those instances when said request for service is a request for video on-demand-service and said first dedicated portion of said bandwidth does not have sufficient unused bandwidth available to support the requested video on-demand service, the system, e.g., a switched digital video—resource manager module of the system illustrated in FIG. 2, determines if the requested video on-demand service has a higher priority than another service currently utilizing either some of said third (shared) portion of bandwidth or some of said first (VOD) portion of bandwidth. In some embodiments, prior to determining if the requested video on-demand service has a higher priority than another service, the priority of the requested video on-demand service as a function of at least two of: a video on-demand service type, time of day, stream type, programming package type, stream format type, tuner priorities, and viewership priority is determined. In some embodiments of this exemplary method, the step of determining if the requested switched digital video service has a higher priority is performed without first checking if there is unused bandwidth in either said second or third portions of bandwidth. In some embodiments of this method, the numerical priority values associated with different service features are provided by a policy server which supplies priority information to a plurality of hub sites. In such instances, the step of determining the priority of the requested video on-demand service may be, and in some embodiments is, performed at a hub site based on service features corresponding to the requested video on-demand session and the priority values specified by said policy server, said policy server being located remotely from said hub site.

In some embodiments of this exemplary method, the step of determining the priority of the requested video on-demand service includes: summing numerical priority values associated with different service features corresponding to the requested video on-demand service to generate said priority of the requested video on-demand service.

In another aspect of the exemplary method, in accordance with the present invention, the hub site serving a VOD service group and corresponding SDV service group operates as a policy enforcement point to implement priority policies set by said policy server based on information locally available at or logically associated with said hub site (and which in some cases is not available at the policy server at the time the priority determination is made at the hub site).

In some variants of the exemplary method, prior to performing the step of determining if the requested video on-demand service has a higher priority than another service, determining the priority of the another service as a function of at least two of: the service type of the another service, time of day, time of day, stream type, programming package type, stream format type, tuner priorities, and viewership priority.

In some embodiments of the exemplary method the step of determining the priority of the requested video on-demand service includes: summing numerical priority values associated with different service features to generate said priority of the requested video on-demand service.

In some embodiments of the exemplary method, the step of determining if the requested video on-demand service has a higher priority than another service currently utilizing either some of said third (shared) portion of bandwidth or some of said first (VOD) portion of bandwidth further includes: analyzing data pertaining to the historical behavior of users of the first set of customer premise equipment devices including the users' viewing habits for the current time and day of the week; and based upon that analysis giving a higher priority to services that are frequently requested by multiple users within the first set of customer premise equipment devices at that time on that day of the week than to other service requests.

In another exemplary method of providing video on-demand and switched digital video using bandwidth to a first set of customer premise equipment devices in accordance with the present invention, the method comprises: using a first dedicated portion of said bandwidth to provide video on-demand services; using a second dedicated portion of said bandwidth to provide switched digital video services; and using a third portion of said bandwidth to provide both video on-demand and switched digital video services, said third portion of said bandwidth being available for communicating either video on-demand or switched digital video, the size of a video on-demand portion of third portion of bandwidth varying as a function of requests for video on-demand content received from one or more customer premise equipment devices and a video on-demand service priority relative to a switched digital video service priority; and said first, second and third portions of bandwidth correspond a single group of quadrature amplitude modulators corresponding to both a Video on-Demand Service Group and a Switched Digital Service Group used to provide narrowcast digital services to a single group of customer premise equipment devices. In some embodiments, the method further comprises: transmitting a VOD Service Group ID and a SDV Service Group ID using in-band signaling to said single group of customer premise equipment devices, said in-band signaling using a communications band which is also used to provide at least one of video on-demand program content and switched digital video broadcast program content. In some instances of this exemplary method said VOD service Group ID and said SDV service Group ID map to the same group of customer premise equipment devices. Additionally, in some embodiments, the method includes transmitting a VOD IP port identifier and a VOD session resource manager IP address to the customer premise equipment devices. In some embodiments, the video on-demand server 272 transmits this information. In some variants of this method different VOD session resource manager IP addresses are used for different geographic regions and correspond to different session resource managers.

An exemplary system, in accordance with the present invention, includes a content distribution system for providing video on-demand and switched digital video to a first set of customer premise equipment devices, e.g., service group of CPE devices, using bandwidth, the system comprising: a resource manager module configured to allocate a first dedicated portion of said bandwidth for use in providing video on-demand services, a second dedicated portion of said bandwidth for use in providing switched digital video services; and a third portion of said bandwidth to provide both video on-demand and switched digital video services, said third portion of said bandwidth being available for communicating either video on-demand or switched digital video, the size of a video on-demand portion of third portion of bandwidth varying as a function of requests for video on-demand content received from one or more customer premise equipment devices and a video on-demand service priority relative to a switched digital video service priority; and a set of quadrature amplitude modulators coupled to the resource manager module for modulating data on the allocated portions of bandwidth in accordance with said bandwidth allocation by said resource manager. In some embodiments, the resource manager module may be, and is, a server containing software instructions. In some embodiments the resource manager is also configured to respond to a request for service based on the type of service requested and if the request is for switched digital video service the response includes determining if the requested switched digital video service has a higher priority than another switched digital video service currently utilizing either some of said third (shared) portion of bandwidth or some of said second (SDV) portion of bandwidth; and if the request is for video on-demand-service the response includes determining if said first dedicated portion of said bandwidth does not have sufficient unused bandwidth available to support the requested video on-demand service and if the requested video on-demand service has a higher priority than another service currently utilizing either some of said third (shared) portion of bandwidth or some of said first (VOD) portion of bandwidth.

In another embodiment, in accordance with the present invention, the resource manager module of the aforementioned exemplary system is further configured to respond to a request for service based on the type of service requested; and if the request is for switched digital video service the response includes determining if the requested switched digital video service has a higher priority than another switched digital video service currently utilizing either some of said third (shared) portion of bandwidth or some of said second (SDV) portion of bandwidth; and if the request is for video on-demand-service the response includes determining if said first dedicated portion of said bandwidth does not have sufficient unused bandwidth available to support the requested video on-demand service and if the requested video on-demand service has a higher priority than another service currently utilizing either some of said third (shared) portion of bandwidth or some of said first (VOD) portion of bandwidth. In this embodiment, said resource manager module, may be and in some instances is, configured: to determine, prior to determining if the requested video on-demand service has a higher priority than another service, the priority of the requested video on-demand service as a function of at least two of: a video on-demand service type, time of day, stream type, programming package type, stream format type, tuner priorities, and viewership priority; and wherein determining the priority of the requested video on-demand service includes summing numerical priority values associated with different service features corresponding to the requested video on-demand service to generate said priority of the requested video on-demand service. In some embodiments, this exemplary system further comprises a policy server which is configured to supply priority information including numerical priority values associated with different service features to said manager module. In some embodiments, the bandwidth sharing mechanism module includes the policy server. In some embodiments, a resource manager such as the Session Resource Manager module 220 or the Switched Digital Video Server—Resource Manager module 270 of FIG. 2 performs the function of the policy server.

In some embodiments of the exemplary systems described above in accordance with the present invention, the set of quadrature amplitude modulators correspond to both a Video on-Demand Service Group and a Switched Digital Service Group used to provide narrowcast digital services to a single group of customer premise equipment devices. In such systems, the resource manager module may be, and in some instances is, configured to transmit a VOD Service Group ID and a SDV Service Group ID using in-band signaling to said single group of customer premise equipment devices, said in-band signaling using a communications band which is also used to provide at least one of video on-demand program content and switched digital video broadcast program content; and wherein said VOD service Group ID and said SDV service Group ID map to the same group of customer premise equipment devices.

Another exemplary embodiment of the present invention includes the use of a non-transitory computer readable medium having machine executable instructions stored thereon for controlling the distribution of video on-demand and switched digital video using bandwidth to a first set of customer premise equipment devices, the non-transitory computer readable medium including: code for controlling a processor's, e.g., switched digital video resource manager module's processor's, use of a first dedicated portion of said bandwidth to provide video on-demand services; code for controlling the processor's use of a second dedicated portion of said bandwidth to provide switched digital video services; and code for controlling the processor use of a third portion of said bandwidth to provide both video on-demand and switched digital video services, said third portion of said bandwidth being available for communicating either video on-demand or switched digital video, the size of a video on-demand portion of third portion of bandwidth varying as a function of requests for video on-demand content received from one or more customer premise equipment devices and a video on-demand service priority relative to a switched digital video service priority.

In various embodiments system elements described herein are implemented using one or more modules which are used to perform the steps corresponding to one or more methods of the present invention, for example, a resource manager module performs the step of responding to a request for service based on the type of service requested. Each step may be performed by one or more different software instructions executed by a computer processor, e.g., a central processing unit (CPU). In some embodiments the modules may be and are implemented in software. In some embodiments, the modules may be and are implemented as servers. In some embodiments the modules may be, and are implemented in hardware, e.g., as circuits. In some embodiments the modules may be, and are, implemented in a combination of hardware and software.

At least one system implemented in accordance with the present invention includes a means for implementing each of the various steps which are part of the methods of the present invention. Each means may be, e.g., an instruction, processor, hardware circuit and/or combination of elements used to implement a described step. Many of the above described methods or method steps can be implemented using machine, e.g., computer, executable instructions, such as software, included in a machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow. Such variations are to be considered within the scope of the invention.

What is claimed is:

1. A method of providing video on-demand and switched digital video using bandwidth to a first set of customer premise equipment devices, the method comprising:
apportioning said bandwidth so that it includes a first portion, a second portion and a third portion, said first portion of bandwidth being dedicated for communicating video-on demand, said second portion of bandwidth being dedicated for communicating switched digital video, and said third portion of bandwidth being available for communicating either video on-demand or switched digital video;
using said first dedicated portion of said bandwidth to provide video on-demand services;
using said second dedicated portion of said bandwidth to provide switched digital video services; and
using said third portion of said bandwidth to provide both video on-demand and switched digital video services, the size of a video on-demand portion of said third portion of bandwidth varying as a function of requests for video on-demand content received from one or more customer premise equipment devices and a video on-demand service priority relative to a switched digital video service priority;
responding to a request for service based on the type of service requested, responding to a request for service including, when said request for service is a request for video on-demand-service and said first dedicated portion of said bandwidth does not have sufficient unused bandwidth available to support the requested video on-demand service:
(i) determining the priority of the requested video on-demand service as a function of at least two of the following features: a video on-demand service type, time of day, stream type, programming package type, stream format type, tuner priorities, and viewership priority, wherein said determining the priority of the requested video on-demand service includes summing numerical priority values associated with different features corresponding to the requested video on-demand service to generate said priority of the requested video on-demand service;
and (ii) determining if the requested video on-demand service has a higher priority than another service currently utilizing either some of said third portion of bandwidth or some of said first portion of bandwidth.

2. The method of claim 1,
wherein said video on-demand service priority is a priority for a video on-demand service;
wherein said switched digital video service priority is a priority for a switched digital video service;
wherein said apportionment of said first, second and third portions of bandwidth do not change from a first time to a second time; and
wherein said size of said video-on demand portion of said third portion of bandwidth increases from said first time to said second time.

3. The method of claim 1,
wherein responding to the request for service includes allocating bandwidth in the first dedicated portion of said bandwidth if the requested service is a video on-demand service and the first dedicated portion of said bandwidth has sufficient unused bandwidth available to support the requested video on-demand service; and
wherein using said first dedicated portion of said bandwidth to provide video on-demand services includes operating a communications device which does not support bandwidth sharing to use at least a portion of said first dedicated portion of said bandwidth.

4. The method of claim 1, further comprising:
responding to a request for service
request for service is a request for a switched digital video service determining if the requested switched digital video service has a higher priority than another switched digital video service currently utilizing either some of said third portion of bandwidth or some of said second portion of bandwidth.

5. The method of claim 4 wherein the requested switched digital video service has a priority which is higher than any inactive switched digital video service utilizing a portion of said second or third bandwidth, further comprising:
utilizing portions of said second and third portions of bandwidth which are not being utilized by an active switched digital video service or a video on-demand service to communicate data corresponding to one or more inactive switched digital video services.

6. The method of claim 5 wherein more than 90% of the second and third portions of bandwidth are utilized on a continuous basis.

7. The method of claim 1, wherein the numerical priority values associated with different service features are provided by a policy server which supplies priority information to a plurality of hub sites.

8. The method of claim 7, wherein determining the priority of the requested video on-demand service is performed at a hub site based on service features corresponding to the requested video on-demand session and the priority values specified by said policy server, said policy server being located remotely from said hub site.

9. The method of claim 8, wherein the hub site serving a VOD service group and corresponding SDV service group operates as a policy enforcement point to implement priority policies set by said policy server based on information locally available at or logically associated with said hub site.

10. The method of claim 1, further comprising:
prior to determining if the requested video on-demand service has a higher priority than another service, determining the priority of the another service as a function of at least two of:
the service type of the another service, time of day, time of day, stream type, programming package type, stream format type, tuner priorities, viewership priority.

11. The method of claim 1, wherein the determining if the requested video on-demand service has a higher priority than another service currently utilizing either some of said third portion of bandwidth or some of said first portion of bandwidth further includes:
analyzing data pertaining to the historical behavior of users of the first set of customer premise equipment devices including the users' viewing habits for the current time and day of the week; and
based upon that analysis giving a higher priority to services that are frequently requested by multiple users within the first set of customer premise equipment devices at that time on that day of the week than to other service requests.

12. The method of claim 1, wherein said first, second and third portions of bandwidth correspond a single group of quadrature amplitude modulators corresponding to both a Video on-Demand Service Group and a Switched Digital Service Group used to provide narrowcast digital services to a single group of customer premise equipment devices.

13. The method of claim 12, further comprising:
transmitting a VOD Service Group ID and a SDV Service Group ID using in-band signaling to said single group of customer premise equipment devices, said in-band signaling using a communications band which is also used to provide at least one of video on-demand program content and switched digital video broadcast program content.

14. The method of claim 13, wherein said VOD service Group ID and said SDV service Group ID map to the same group of customer premise equipment devices.

15. The method of claim 14, further comprising:
transmitting a VOD IP port identifier and a VOD session resource manager IP address.

16. The method of claim 15 wherein different VOD session resource manager IP addresses are used for different geographic regions and correspond to different session resource managers.

17. A content distribution system for providing video on-demand and switched digital video to a first set of customer premise equipment devices using bandwidth, the system comprising:
a resource manager configured to allocate a first dedicated portion of said bandwidth for use in providing video on-demand services, a second dedicated portion of said bandwidth for use in providing switched digital video services, and a third portion of said bandwidth to provide both video on-demand and switched digital video services, said third portion of said bandwidth being available for communicating either video on-demand or switched digital video, the size of a video on-demand portion of third portion of bandwidth varying as a function of requests for video on-demand content received from one or more customer premise equipment devices and a video on-demand service priority relative to a switched digital video service priority, said resource manager being further configured to respond to a request for service based on the type of service requested when said request for service is a request for video on-demand service and said first dedicated portion of said bandwidth does not have sufficient unused bandwidth available to support the requested video on-demand service, said responding including:
(i) determining the priority of the requested video on-demand service as a function of at least two of the following features: a video on-demand service type, time of day, stream type, programming package type, stream format type, tuner priorities, and viewership priority, wherein said determining the priority of the requested video on-demand service includes summing numerical priority values associated with different features corresponding to the requested video on-demand service to generate said priority of the requested video on-demand service; and
(ii) determining if the requested video on-demand service has a higher priority than another service currently utilizing either some of said third portion of bandwidth or some of said first portion of bandwidth; and
a set of quadrature amplitude modulators coupled to the resource manager for modulating data on the allocated portions of bandwidth in accordance with said bandwidth allocation by said resource manager.

18. The system of claim 17, wherein said resource manager is further configured to respond to a request for service based on the type of service requested when said request for service is a request;
for switched digital video service the response includes determining if the requested switched digital video service has a higher priority than another switched digital video service currently utilizing either some of said third portion of bandwidth or some of said second portion of bandwidth.

19. The system of claim 18, further comprising:
a policy server which is configured to supply priority information including numerical priority values associated with different service features to said resource manager.

20. The system of claim 17, wherein said set of quadrature amplitude modulators correspond to both a Video on-Demand Service Group and a Switched Digital Service Group used to provide narrowcast digital services to a single group of customer premise equipment devices.

21. The system of claim 20, wherein said resource manager is further configured to transmit a VOD Service Group ID and a SDV Service Group ID using in-band signaling to said single group of customer premise equipment devices, said in-band signaling using a communications band which is also used to provide at least one of video on-demand program content and switched digital video broadcast program content; and wherein said VOD service Group ID and said SDV service Group ID map to the same group of customer premise equipment devices.

22. A non-transitory computer readable medium having machine executable instructions stored thereon for controlling the distribution of video on-demand and switched digital video using bandwidth to a first set of customer premise equipment devices, the non-transitory computer readable medium including:
code for controlling a processor to use a first dedicated portion of said bandwidth to provide video on-demand services;
code for controlling the processor to use a second dedicated portion of said bandwidth to provide switched digital video services; and
code for controlling the processor to use a third portion of said bandwidth to provide both video on-demand and switched digital video services, said third portion of said bandwidth being available for communicating either video on-demand or switched digital video, the size of a video on-demand portion of third portion of bandwidth varying as a function of requests for video on-demand content received from one or more customer premise equipment devices and a video on-demand service priority relative to a switched digital video service priority; and
code for controlling the processor to respond to a request for service based on the type of service requested, responding to a request for service including, when said request for service is a request for video on-demand service and said first dedicated portion of said bandwidth does not have sufficient unused bandwidth available to support the requested video on-demand service:
(i) determining the priority of the requested video on-demand service as a function of at least two of the following features: a video on-demand service type, time of day, stream type, programming package type, stream format type, tuner priorities, and viewership priority, wherein said determining the priority of the requested video on-demand service includes summing numerical priority values associated with different features corresponding to the requested video on-demand service to generate said priority of the requested video on-demand service;
and (ii) determining if the requested video on-demand service has a higher priority than another service currently utilizing either some of said third portion of bandwidth or some of said first portion of bandwidth.

\* \* \* \* \*